United States Patent [19]
Kim

[11] Patent Number: 5,440,216
[45] Date of Patent: Aug. 8, 1995

[54] ROBOT CLEANER

[75] Inventor: Tae-Sig Kim, Suwon-city, Rep. of Korea

[73] Assignee: Samsung Electronics Co., Ltd., Kyungki-do, Rep. of Korea

[21] Appl. No.: 73,398

[22] Filed: Jun. 8, 1993

[51] Int. Cl.6 .............................................. G05D 1/02
[52] U.S. Cl. .............................. 318/587; 318/568.10; 318/568.12; 901/1; 15/319
[58] Field of Search ................................ 318/560–646; 901/1, 3, 5, 7, 9, 12, 13; 395/80–99; 180/165–169, 19.3, 6.5, 279, 280, 275, 274; 15/319, 339

[56] References Cited

U.S. PATENT DOCUMENTS

| | | | |
|---|---|---|---|
| 4,306,329 | 12/1981 | Yokoi | 180/167 |
| 4,638,445 | 1/1987 | Mattaboni | 180/168 |
| 4,710,020 | 12/1987 | Maddex et al. | 901/1 |
| 4,777,416 | 10/1988 | George, II et al. | 318/568 |
| 4,875,172 | 10/1989 | Kanayama | 901/1 |
| 4,924,153 | 5/1990 | Toru et al. | 318/587 |
| 4,963,453 | 10/1990 | Pong et al. | 180/167 |
| 4,967,862 | 11/1990 | Pong et al. | 180/19.3 |
| 5,023,444 | 6/1991 | Ohman | 180/274 |
| 5,023,790 | 6/1991 | Luke, Jr. | 180/168 |
| 5,032,775 | 7/1991 | Mizuno et al. | 318/587 |
| 5,109,566 | 5/1992 | Kobayashi et al. | 180/169 |
| 5,204,814 | 4/1993 | Noonan et al. | 180/168 |
| 5,279,672 | 1/1994 | Betker et al. | 180/169 X |
| 5,284,522 | 2/1994 | Kobayashi et al. | 180/169 X |

Primary Examiner—Paul Ip
Attorney, Agent, or Firm—Sughrue, Mion, Zinn, Macpeak & Seas

[57] ABSTRACT

A self moving robot cleaner capable of moving to an automatic charging unit to charge its battery when a charging voltage of the battery is decreased to below a predetermined level during a cleaning operation and then again carrying out the cleaning operation. The robot cleaner has a cleaner body, a suction unit provided in the cleaner body for sucking dirt on a floor, a navigation sensor positioned at an upper portion of the cleaner body for sensing a distance to and a direction of an obstacle and for outputting a distance sensing signal and a direction sensing signal, a driving unit positioned at a lower portion of the cleaner body for moving the cleaner body in a moving direction, and a control unit for determining a cleaning area and a moving direction in response to the distance sensing signal and the direction sensing signal from the navigation sensor and outputting a control signal to move the cleaner body and a control signal to drive the suction unit.

48 Claims, 16 Drawing Sheets

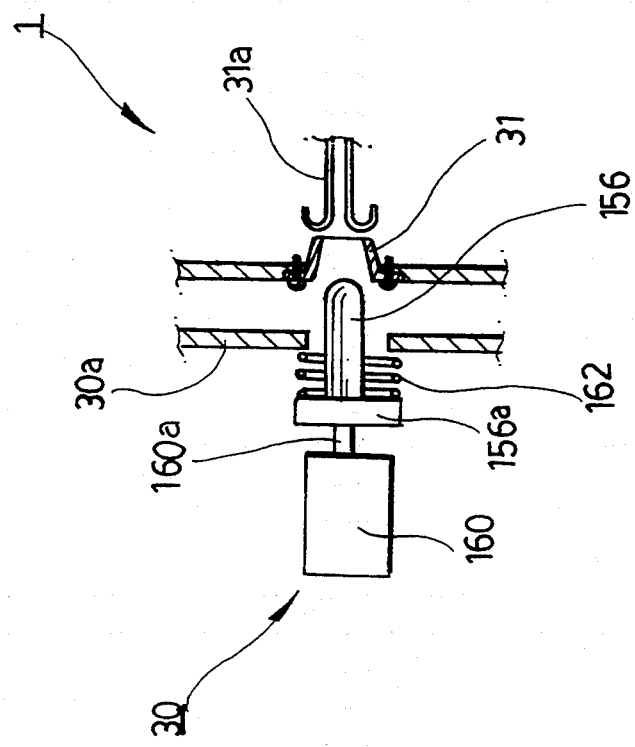

ROBOT CLEANER

FIELD OF THE INVENTION

The present invention generally relates to a robot cleaner capable of cleaning a floor while moving on a floor by itself, and more particularly to a self-moving robot cleaner which is capable of moving to an automatic charging means to charge its battery when a charging voltage of the battery is decreased to below a predetermined level during a cleaning operation and then returning to the interrupted cleaning position to again carry out the cleaning operation.

BACKGROUND OF THE INVENTION

A self-moving robot cleaner is disclosed in Japanese Patent No. Sho 58-221925. The self-moving robot cleaner disclosed in this Japanese Patent carries out a cleaning operation as follows. A high reflexibility tape is attached to a floor along a desired path to be cleaned. An optical sensor of the robot cleaner strikes light on the tape and receives the reflected light from the tape in order to search the path of the tape. Therefore, the robot cleaner can suck dust and dirt from a floor while moving along the path defined by the tape.

As another conventional vacuum cleaner, there is, of course, the well known manual vacuum cleaner. However, in the manual vacuum cleaner, the user should carry a nozzle for sucking dusk and dirt so as to clean a wide floor and a hose for introducing dust and dirt into a dirt-collecting chamber should be limited to a substantially shortened length. Although the manual vacuum cleaner having the shortened hose can clean a floor without any particular problem when the floor is narrow, a canister and the nozzle of the vacuum cleaner must be frequently moved during cleaning operation when a floor is wide.

In addition, a moving range of the vacuum cleaner is restricted by the length of the power cord for connecting the vacuum cleaner to a power source. Also, when the vacuum cleaner cleans a wide floor, a plug of the power cord must be frequently plugged in power sources at different positions because the power cord is short. When a power source is not available in the vicinity of a floor to be cleaned, it is necessary to provide an additional extension cord for connecting the plug to a main power source. Furthermore, since the user must carry the vacuum cleaner during the cleaning operation, the user must endure troublesome noise generated from the cleaner.

SUMMARY OF THE INVENTION

The present invention has been made in view of the above-described problem occurring in the prior art and an object of the invention is to provide a robot cleaner which is capable of cleaning while moving on a floor to be cleaned under the control of a microprocessor.

Another object of the invention is to provide a robot cleaner which is capable of moving an automatic charging device by itself and repeatedly charging its battery when power of the battery is discharged to below a predetermined level during a cleaning operation.

In accordance with the present invention, the above and other objects can be accomplished by providing a robot cleaner comprising: a microprocessor for controlling an overall operation of the cleaner; a memory for storing driving programs for the cleaner associated with structures of various rooms to be cleaned; driving means for driving a driving roller under the control of the microprocessor in order to cause the robot cleaner to be moved forward and backward and turned left and right; turning direction sensing means mounted on an upper portion of a bracket of the driving means for sensing a turned angle of the driving means when the driving means is turned left or right; a navigation sensor for detecting a presence of an obstacle and detecting a distance to and a direction of the obstacle on the floor; floor condition sensing means for sensing a depressed portion or a stepped portion on the floor; automatic charging means for charging a battery of the cleaner when a charging voltage of the battery is decreased below a predetermined level; and a vacuum motor for sucking dirt through a nozzle and collecting the dirt in a dirt collecting chamber.

BRIEF DESCRIPTION OF THE DRAWINGS

Other objects and aspects of the invention will become apparent from the following description of embodiments with reference to the accompanying drawings in which:

FIG. 9b is a perspective view of a deflective reflection collar of the navigation sensor of FIG. 9a;

FIG. 12 is an enlarged view of the circle P of FIG. 11b;

DETAILED DESCRIPTION OF THE PREFERRED EMBODIMENTS

A robot cleaner according to an embodiment of the present invention will now be described by referring to accompanying drawings.

Figure 1:
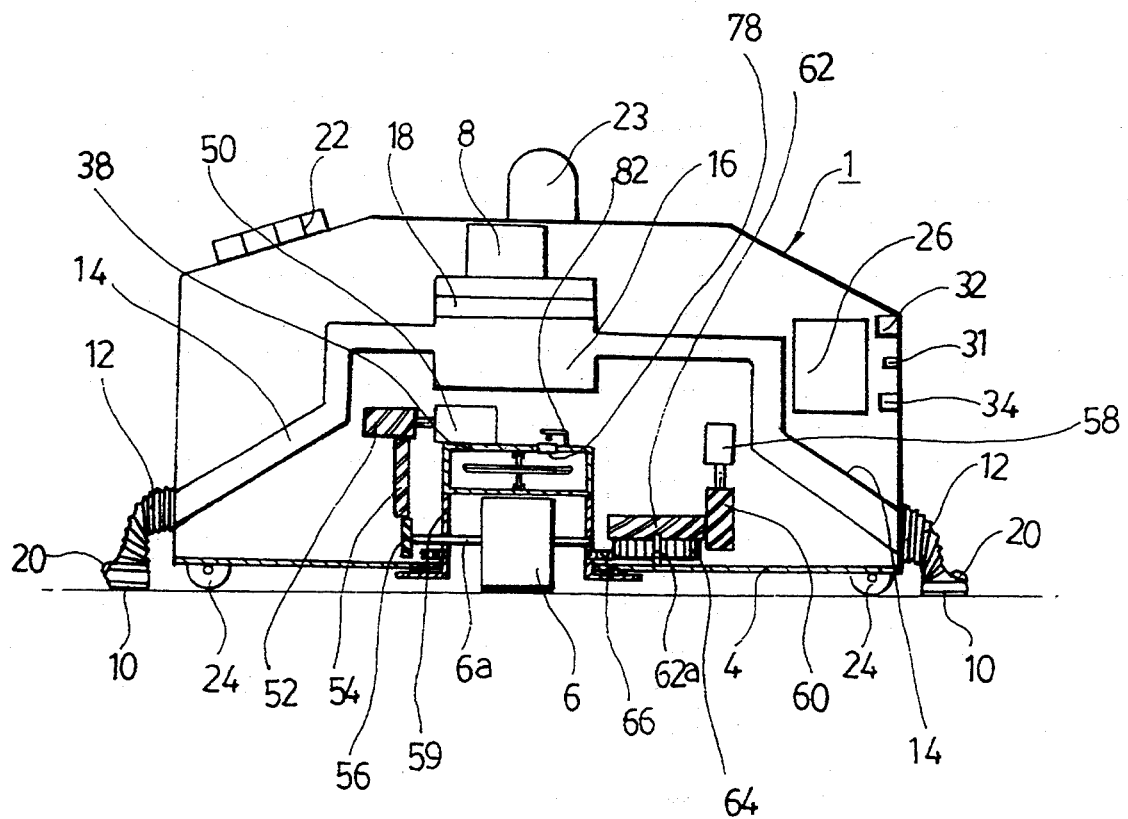
FIG. 1 is a side sectional view of a robot cleaner according to an embodiment of the present invention.
Figure 2:
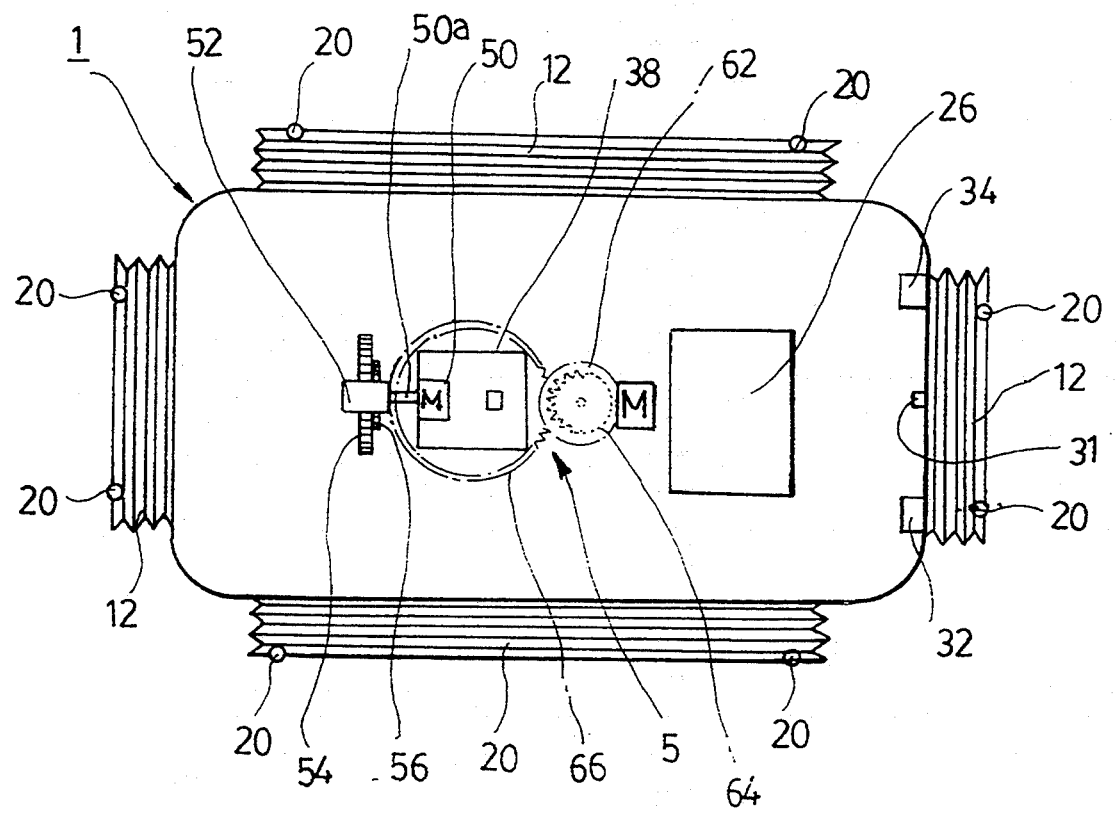
FIG. 2 is a plan view of the robot cleaner of the invention from which a top cover is removed.
Figure 3:
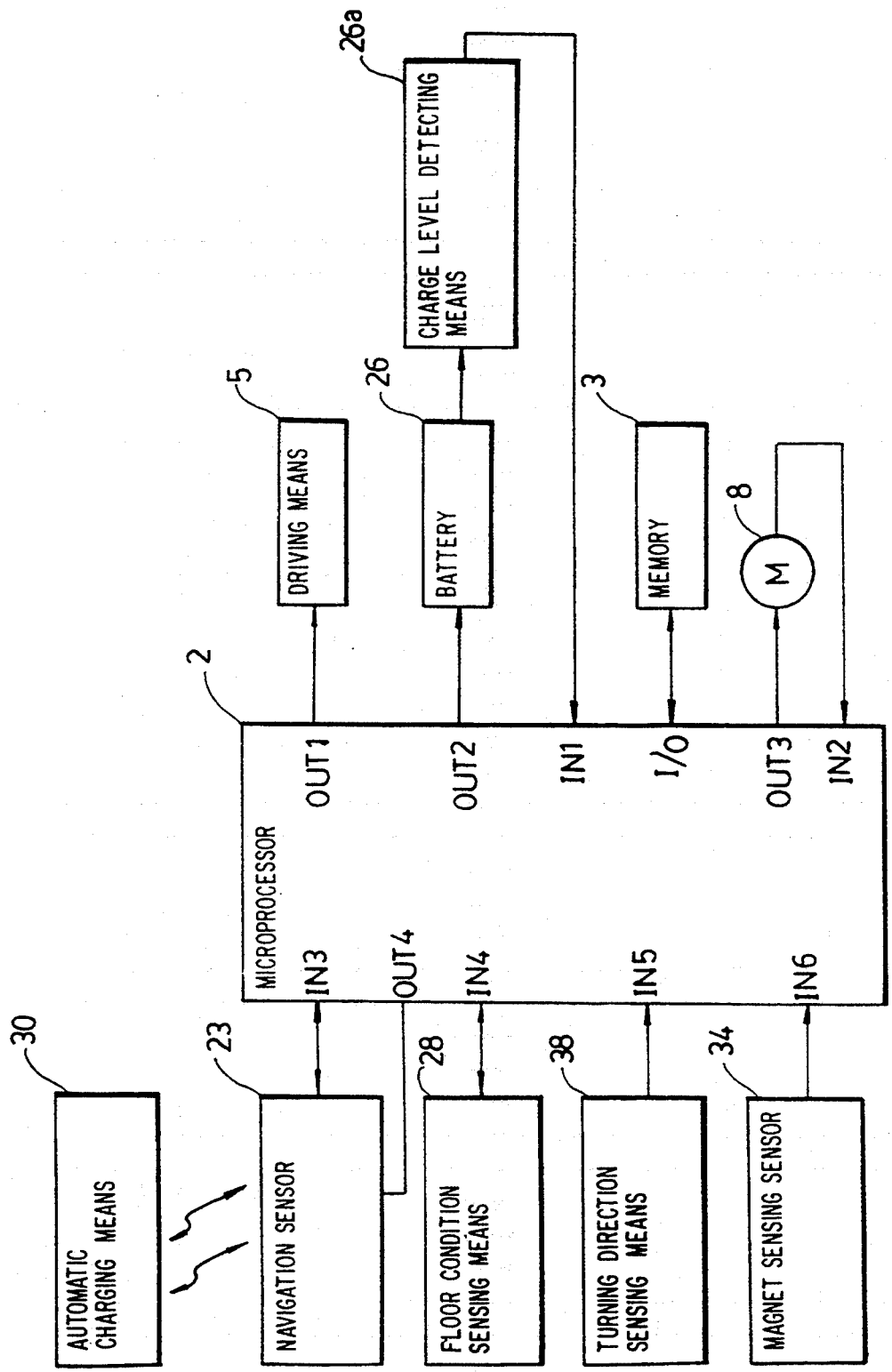
Fig. 3 is a block diagram of a control system of the robot cleaner of the invention.

FIG. 1 shows a schematic side elevation of a robot cleaner body according to an embodiment of the invention, FIG. 2 shows a plan of the robot cleaner body from which a top cover is removed, and FIG. 3 shows a block diagram of a control system of the robot cleaner.

As shown in the drawings, the robot cleaner 1 has a microprocessor 2 for controlling the overall operation of the cleaner, a memory 3 for storing driving programs for the cleaner associated with structures of various rooms to be cleaned, and driving means 5 mounted on an underside of the cleaner 1 and adapted to drive a driving roller 6 under a control of the microprocessor 2 in order to cause the robot cleaner 1 to be moved forward and backward and to turn left and right.

A driving shaft 6a of the driving roller 6 of the driving means 5 is supported by a bracket 59. Disposed on the bracket 59 is a turning direction sensing means 38. Mounted above the driving means 5 is a vacuum motor 8 for sucking dust and dirt from a floor and introducing the sucked dust and dirt into a dirt collecting chamber 16 through nozzles 10, suction ducts 12 and air ducts 14. As schematically shown in FIG. 1, the robot cleaner 1 is provided at its upper case with a control panel 22 for controlling a drive and a stop of the cleaner 1. Also, the robot cleaner 1 is provided at a central position of its upper case with a navigation sensor 23 for detecting a presence of an environmental obstacle and a distance to and a direction of the obstacle. Each of four corners of a bottom plate 4 is provided with a caster 24 of floor condition sensing means in order to sense an abnormal condition of a floor, for example, a depressed portion and a stepped portion of the floor. A side wall of the robot cleaner 1 is provided with a magnet 32, magnet sensing means 34 and a charging receptacle 31 for guiding an access to the automatic charging means 30 (see FIGS. 9 and 10) and applying a charging power to a battery 26 when charge level detecting means 26a detects that a charging level of the battery 26 is decreased to below a predetermined level, so that an ultrasonic receiver of an ultrasonic sensor 116 of the navigation sensor 24 receives an ultrasonic wave generated from an ultrasonic wave oscillator 150 of the automatic charging means 30.

In the above construction, a filter such as a sponge and the like, which is adapted to pass air therethrough but filter off dirt, is interposed between the dirt collecting chamber 16 and the vacuum motor 8, so that the dust and dirt collected in the dirt collecting chamber 16 cannot be introduced into the vacuum motor 8, thereby preventing motor trouble. The battery 26 for supplying its charging power as a driving energy of the robot cleaner 1 is positioned above the air duct 14. The nozzles 10 connected to the air ducts 14 via the suction ducts 12 each is provided at its outer end with a pair of rollers 20 in order to prevent the suction ducts 12 from being damaged and drive the robot cleaner 1 smoothly when the robot cleaner 1 comes into collision with a wall of a room.

Figure 4:
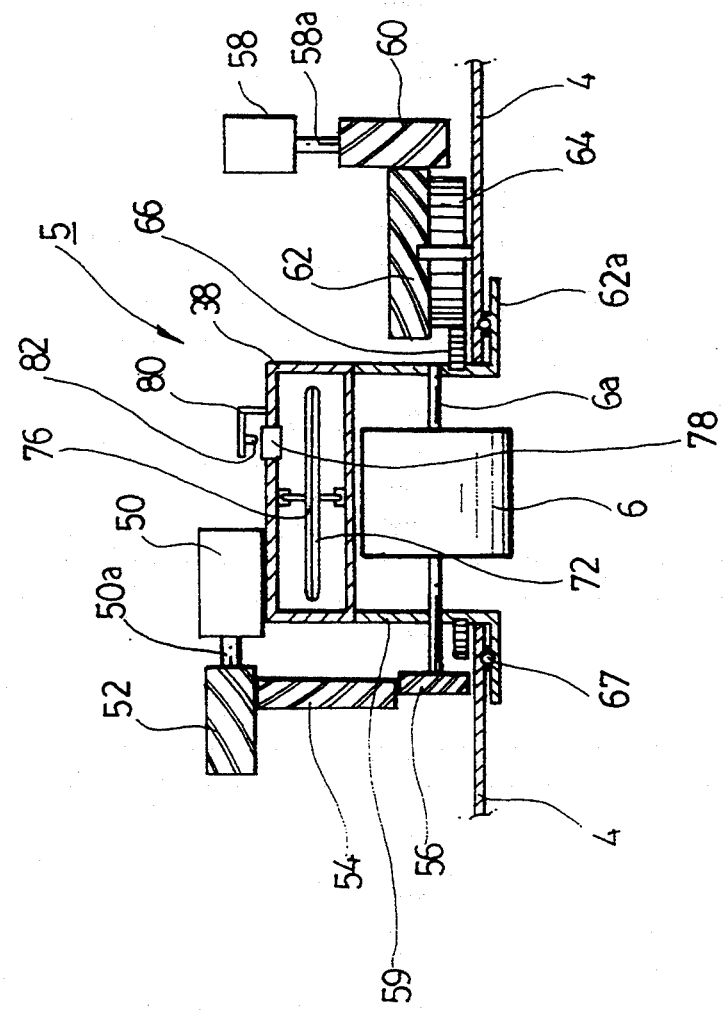
FIG. 4 is a front view of the driving means for the robot cleaner of the invention.
Figure 5:
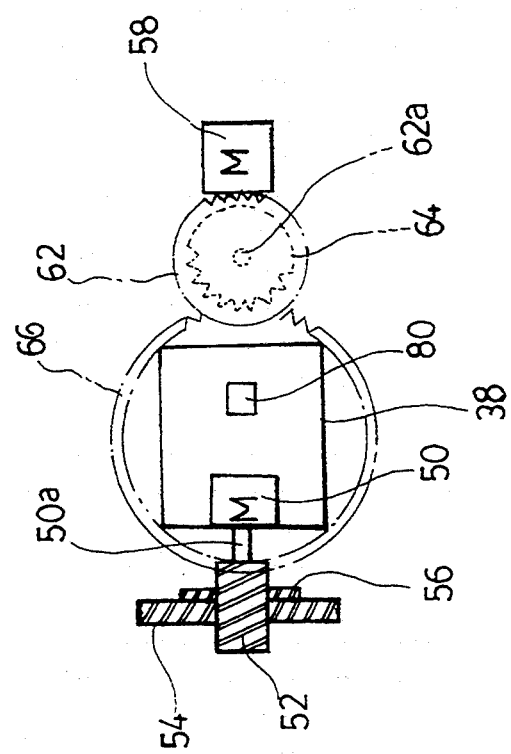
FIG. 5 is a schematic view showing an operation of a turning conversion gear and a turning conversion motor of the driving means of FIG. 4.

The driving means 5 of the invention will now be described with reference to FIGS. 4 and 5. FIG. 4 shows a front of the driving means for the robot cleaner of the present invention, and FIG. 5 shows schematically a turning conversion gear and a turning conversion motor of the driving means of the invention.

The driving means 5 comprises straight driving means for moving the robot cleaner 1 forward or backward and turning conversion means for converting a turning direction of the cleaner into a left turn or a right turn in response to control signals outputted from an output port (OUT1) of the microprocessor 2.

The straight driving means comprises a first driving motor 50 rotating normally and reversely, a first worm 52 fixed to a rotating shaft 50a of the first driving motor 50, a first worm wheel 54 engaging with the first worm 52 for transmitting the rotation force of the first worm 52, a second worm wheel 56 engaging with the first worm wheel 54 for adjusting the rotative speed, and the driving roller 6 connected to a driving shaft 6a of the second worm wheel 56 and adapted to be rotated normally and reversely.

The turning conversion means comprises a turning conversion motor 58 rotating normally and reversely, a second worm 60 fixed to a driving shaft 58a of the turning conversion motor 58, a third worm wheel 62 engaging with the second worm 60, a first spur gear 64 concentrically attached to an underside of the third worm wheel 62 for adjusting the rotative speed, a turning conversion gear engaging with the first spur gear 64 and fixed to a periphery of the bracket 59 for turning the bracket 59 clockwise and counterclockwise, and a ball bearing 67 interposed between a flange 62a of the bracket 59 and the bottom plate 4 of the cleaner 1 for permitting the bracket 59 to be turned smoothly.

In the construction of the above driving means 5, the number of gear teeth formed at the first worm wheel 54 is larger than that of the second worm wheel 56, and the number of gear teeth formed at the third worm wheel 62 is larger than that of the first spur gear 64. Also, direct current (DC) motors may be used as the first driving motor 50 and the turning conversion motor 58.

Figure 6A:
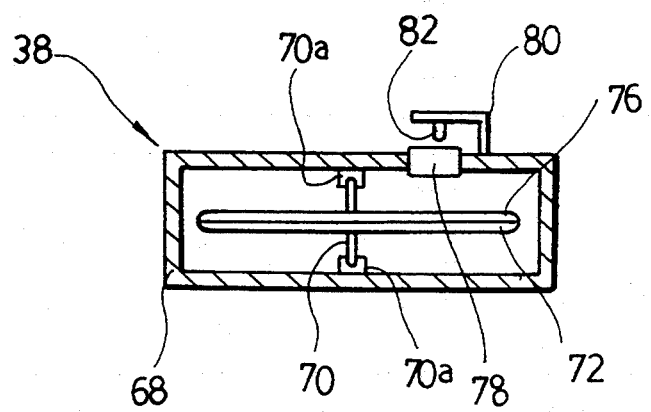
FIG. 6a is an enlarged sectional view of turning direction sensing means of the invention.
Figure 6B:
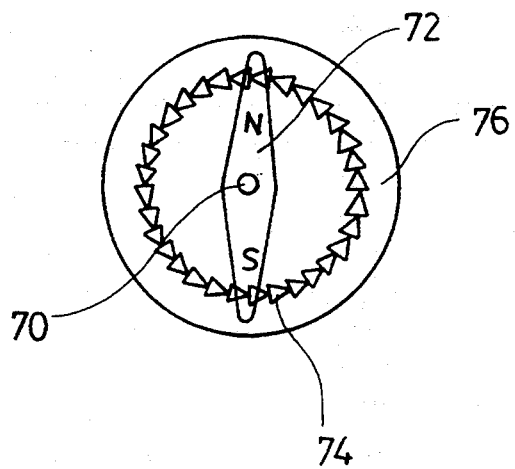
FIG. 6b is a plan view of a reflection disc of the turning direction sensing means in FIG. 6.

The turning direction sensing means of the invention will now be described with reference to FIGS. 4, 6a and 6b. FIG. 6a shows a section of the turning direction sensing means and FIG. 6b shows a magnetic needle and a reflection disc 76 of the turning direction sensing means in FIG. 6a. The turning direction sensing means 38 is mounted on the bracket 59 of the driving means 5 and serves to discriminate whether the robot cleaner 1 has been precisely turned by sensing a turning angle of the turning conversion means and to output the discriminated result to an input port (IN5) of the microprocessor 2.

As illustrated in FIGS. 4, 6a and 6b, the turning direction sensing means 38 comprises a hermetic container 68 containing transparent oil or liquid, a magnetic needle 72 for indicating the north pole and the south pole which is rotatably mounted by means of a central pin 70 supported in upper and lower supporters 70a of the hermetic container 68, a reflection disc 76 attached to the magnetic needle 72 and rotatably supported by the central pin 70 which is attached with a plurality of triangular reflective mirrors 74 defining a circle shape, a condensing lens 78 attached to a top of the hermetic container for condensing light, and an optical sensor 82 mounted above the condensing lens 78 which is adapted to detect a turning angle of the driving means by emitting light to the reflection mirror 74 attached to the reflection disc 76 and receiving the reflected light via the condensing lens 78 and to output the detected data to the input port (IN5) of the microprocessor 2.

In the above-mentioned turning direction sensing means, when it is desired to divide a circumferential angle of the reflection disc 76 into angles of 1°, 360 reflective mirrors 74 are attached to the reflection disc 76 at a uniform interval. Also, when it is desired to divide the circumferential angle into angles of 10°, 36 mirrors 74 are attached to the disc 76. In the present embodiment, 36 to 720 reflective mirrors 74 are attached to the reflection disc 76. The reason why the reflective mirrors 74 are shaped into triangle forms is that the clockwise and the counterclockwise turning of the robot cleaner 1 can be easily discriminated by the reflective mirrors 74.

More specifically, when the amount of light received in the optical sensor 82 of the turning direction sensing means 38 becomes smaller gradually and repeatedly while the optical sensor 82 emits light to the reflective mirrors 74 and receives the reflected light from the mirrors 74, the optical sensor 82 can discriminate that the robot cleaner 1 is turning counterclockwise because the points of the triangular mirrors 74 face counterclockwise continuously. In contrast to above case, when amount of light received in the optical sensor 82 becomes larger gradually and repeatedly, the optical sensor 82 can discriminate that the robot cleaner 1 is turning clockwise.

Also, when the driving roller 6 is turned clockwise through 90° in case of the reflection disc 76 having 36 reflective mirrors 74, since the optical sensor 82 of the turning direction sensing means 38 is turned clockwise with respect to the disc 76, the optical sensor 82 senses that the receiving light through the condensing lens 78 from the reflective mirrors 74 becomes larger repeatedly 9 times and outputs the sensed data to the input port (IN5) of the microprocessor 2 so as to permit the microprocessor 2 to discriminate whether the cleaner 1 has been turned clockwise through 90°.

Figure 7:
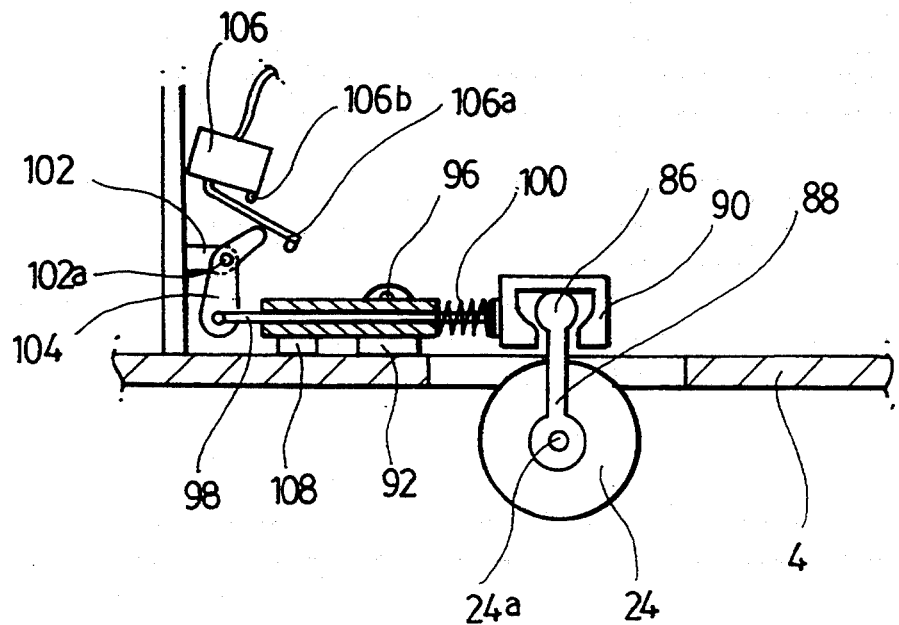
FIG. 7 is a schematic side view of floor condition sensing means of the invention.

The floor condition sensing means of the invention will now be described with reference to FIGS. 7 and 8a-8b. FIG. 7 shows the floor condition sensing means of the invention, FIG. 8a shows an operation of the floor condition sensing means at a depressed portion and FIG. 8b shows an operation of the floor condition sensing means at a stepped portion.

As shown in the drawings, the floor condition sensing means 28 comprises a caster 24, a link member 88 which rotatably supports a central shaft 24a of the caster 24 at its one end and is integrally formed with an enlarged ball portion 86 at the other end, a support member 90 which pivotally holds the ball portion 86 of the link member 88, an actuating cylinder 94 which is pivotally mounted at its middle portion on a pin 96 of a fulcrum 92 formed at the bottom plate 4, a coil spring 100 as a biasing means interposed between the support member 90 and the actuating cylinder 94, an actuating rod 98 inserted in the actuating cylinder 94 and the coil spring 100 and fixed to the support member 90 which is adapted to be compressed when the caster 24 encounters a stepped portion, a connecting lever 104 pivotally mounted on a pin 102a of a stationary bracket 102 at its middle portion which is connected to the actuating rod 98 at its one end, and a microswitch 106 which detects whether the caster 24 encounters a depressed portion and a stepped portion by the pushing action of the actuating cylinder 94 and the pivoting action of the connecting lever 104 and outputs the detected signal to an input port (IN4) of the microprocessor 2.

In the above-constructed floor condition sensing means, since the actuating cylinder 94 maintains its horizontal state by contact with a sustainer 108 in case of a floor free from an uneven surface (such as a depressed portion or a stepped portion), as shown in FIG. 7, the actuating rod 98 compresses the coil spring 100 by the connecting lever 104. In this state, although a contact lever 106a of the microswitch 106 is in contact with an upper end of the connecting lever 104, the contact lever 106a is disconnected from a contact 106b of the microswitch 106. That is, since the microswitch 106 does not detect an uneven surface of a floor to be cleaned such as a depressed portion or a stepped portion, the microswitch 106 does not output any signal to the input port (IN4) of the microprocessor 2. Therefore, the robot cleaner 1 continues its movement.

Figure 8A:
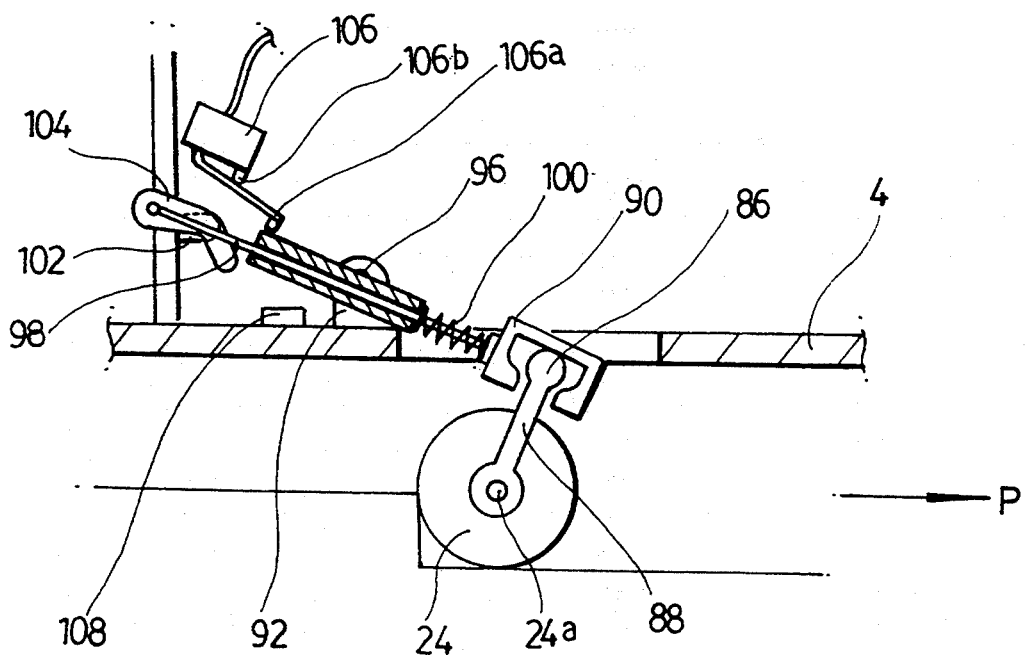
FIG. 8a is a side view of the floor condition sensing means of FIG. 7 which encounters with a depressed portion of a floor.
Figure 8B:
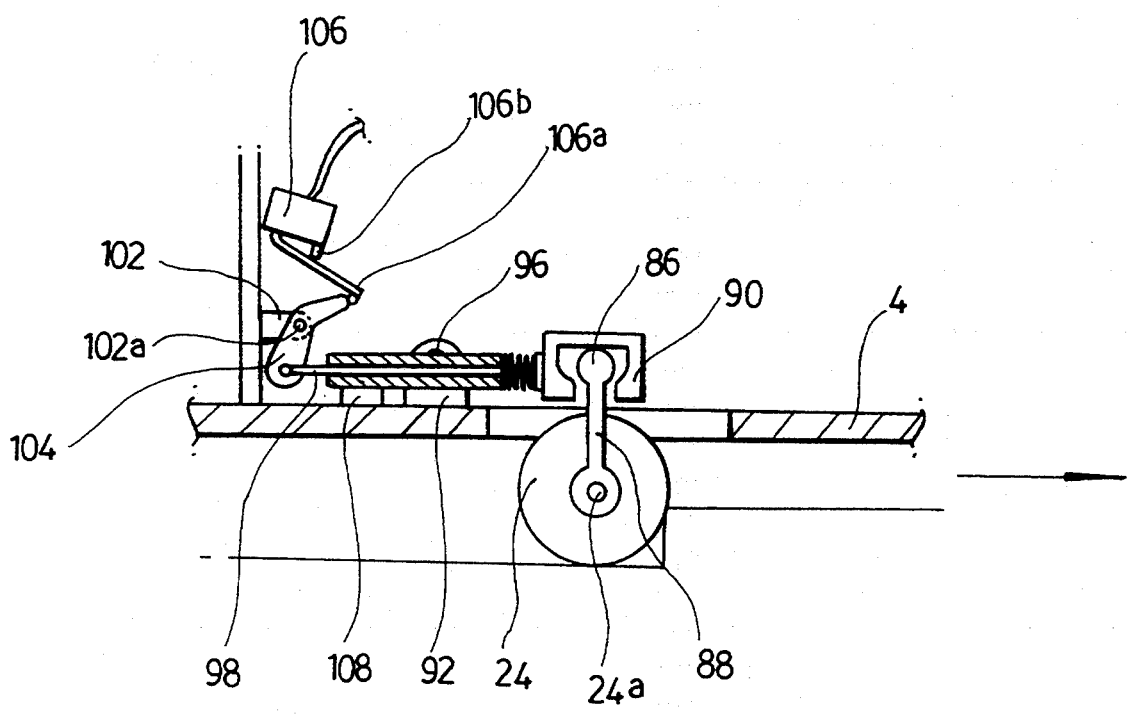
FIG. 8b is a view similar to FIG. 8a which encounters with a stepped portion of a floor.

On the other hand, as shown in FIG. 8a, when the caster 24 falls in a depressed portion of a floor while moving in the direction of arrow "P" in the drawing, the actuating cylinder 94 is separated from the sustainer 108 and rotated clockwise. At this time, the actuating rod 98 is biased rightward by a biasing force of the coil spring 100 and rotates the connecting lever 104 to be separated from the contact lever 106a, and at the same time a raised end of the actuating cylinder 94 comes into contact with the contact lever 106a and pushes the contact lever 106a upward. Hence, the contact lever 106a comes into contact with the contact 106b of the microswitch 106, so that the microswitch 106 outputs a signal indicating a presence of the depressed portion to the input port (IN4) of the microprocessor. In accordance with the signal, the microprocessor 2 senses the depressed portion of the floor and outputs a control signal to the driving means 5. Upon receiving the control signal, the driving means 5 drives the turning conversion motor 58 to cause the robot cleaner 1 to be turned.

Also, as shown in FIG. 8b, when the caster 24 is caught on a stepped portion of a floor to be stopped suddenly while moving in the direction of arrow "T" in the drawing at a uniform speed, an inertia force in the direction of arrow "T" is exerted on coil spring 100. Hence, the actuating rod 98 is moved leftward against the coil spring 100 and thus the connecting lever 104 is rotated clockwise and pushes the contact lever 106a upward, so that the contact lever 104 comes into contact with the contact 106b of the microswitch 106. Subsequently, the microswitch 106 outputs a signal indicating a presence of the stepped portion to the input port (IN4) of the microprocessor. In accordance with the signal, the microprocessor 2 senses the stepped portion of the floor and outputs a control signal to the driving means 5. Upon receiving the control signal, the driving means 5 drives the turning conversion motor 58 to cause the robot cleaner 1 to be turned.

Figure 9A:
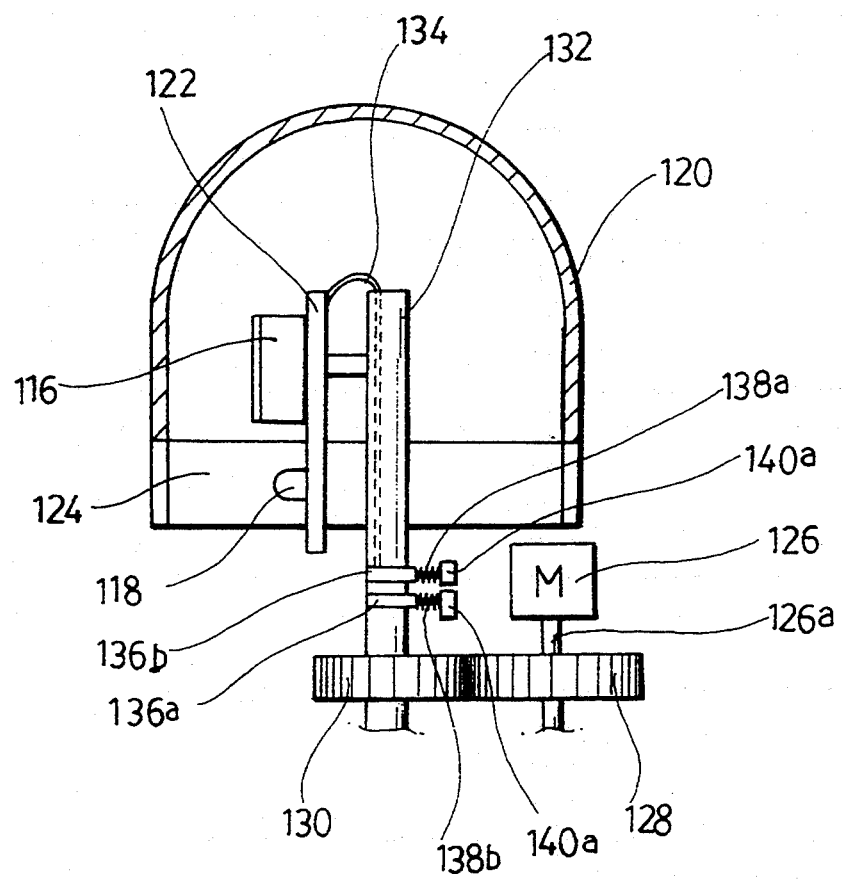
FIG. 9a is a schematic view of a navigation sensor of the invention.
Figure 9B:
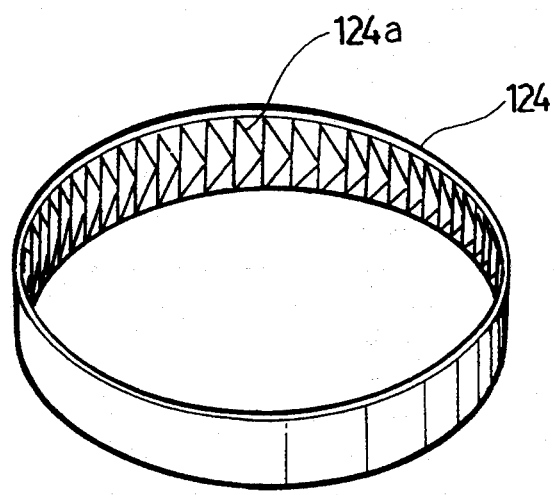

The navigation sensor of the invention will now be described with reference to FIGS. 9a and 9b. FIG. 9a shows the navigation sensor according to an embodiment of the invention and FIG. 9b shows a deflective reflection collar in FIG. 9a.

As shown in the drawings, the navigation sensor 23 comprises an ultrasonic sensor 116 which emits an ultrasonic wave in a moving direction, receives the reflected wave and outputs it to the microprocessor 2 in order to determine a moving distance of the robot cleaner 1, an optical sensor 118 which emits light, receives the reflected light and outputs it to the microprocessor 2 in order to determine a moving direction, a bracket 122 provided with the ultrasonic sensor 116 and the optical sensor 118, a protector 120 for accommodating the ultrasonic sensor 116 and the optical sensor 118, the deflective reflection collar 124 mounted on a lower end of the protector 120 which is adapted to reflect the light emitted from the optical sensor 118, and sensor driving means for rotating the ultrasonic sensor 116 and the optical sensor 118 mounted on the bracket 122.

The sensor driving means comprises a second driving motor 126, a third spur gear 128 fixed to a rotating shaft 126a of the second driving motor 126 for receiving the driving force of the second driving motor 126, a fourth spur gear 130 engaging with the third spur gear 128, and a driving shaft 132 fixed to the center of the fourth spur gear 130 and attached with the bracket 132. In this case, the second driving motor 126 may be a DC motor capable of rotating normally and reversely.

In the above-constructed navigation sensor, lead wires 134 of the bracket 122 and the optical sensor 118 are respectively connected to a pair of conductors 136a and 136b through the bracket 122 and the driving shaft 132. The conductors 136a and 136b are connected to contacts 140a and 140b through springs 138a and 138b respectively. The conductors 136a and 136b are also connected to an input port (IN3) of the microprocessor 2.

The deflective reflection collar 124 is attached with 36 to 720 triangular reflective mirrors 124a at its inner circumference. Accordingly, when the deflective reflection collar 124 has 36 reflective mirrors 124a, an interval between the adjacent reflective mirrors 124a indicates an angle of 10°. Also, when the collar 124 has 720 mirrors 124a, an interval between the adjacent mirrors 124a indicates an angle of 0.5°.

In operation of the navigation sensor 23, when the user operates the robot cleaner 1 by pushing a button on the control panel 22, an output port (OUT4) of the microprocessor 2 outputs a control signal to the navigation sensor 23 to drive the second driving motor 126 and also outputs a control signal to the ultrasonic sensor 116 and the optical sensor 118. Upon driving the second driving motor 126, the driving force of the second driving motor 126 is transmitted to the third spur gear 128 via the rotating shaft 126a to cause the third spur gear 128 to be rotated. At the same time, since the fourth spur gear 130 engaging with the third spur gear 128 is also rotated, the driving shaft 132 fixed to the center of the fourth spur gear 130 is rotated. At this time, since the driving shaft 132 is attached with the bracket 122 having the ultrasonic sensor 116 and the optical sensor 118, the ultrasonic sensor 116 and the optical sensor 118 emit an ultrasonic wave and light and receive the reflected wave and light, respectively while being rotated. Subsequently, the ultrasonic wave sensor 116 and the optical sensor 118 output the reflected wave and light to the input port (IN3) of the microprocessor 2, so that the microprocessor 2 determines a distance to an obstacle and a direction of the obstacle on the basis of the reflected wave and light and then its output port (OUT1) outputs a control signal to the driving means 5 in order to cause the robot cleaner 1 to be moved safely.

Figure 10:
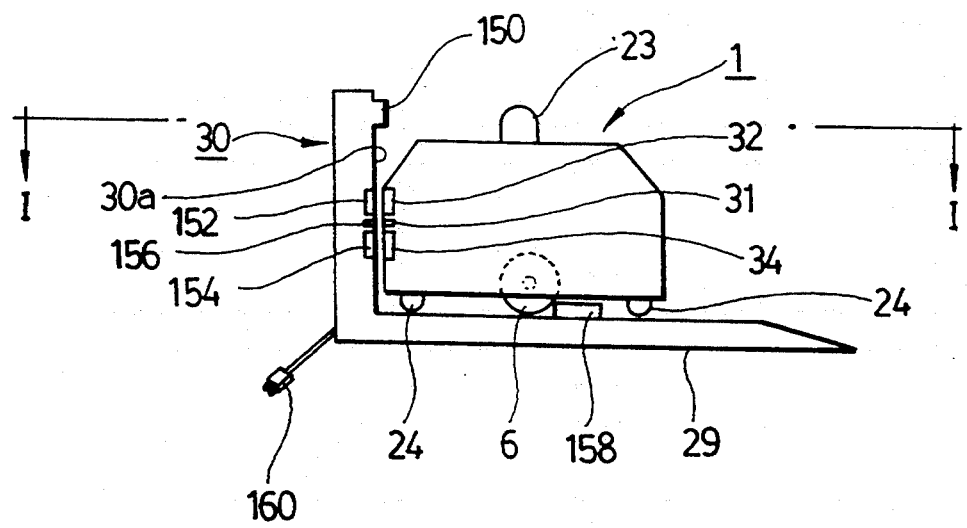
FIG. 10 is a plan view of automatic charging means of the invention to which the robot cleaner of the invention is moved.
Figure 11B:
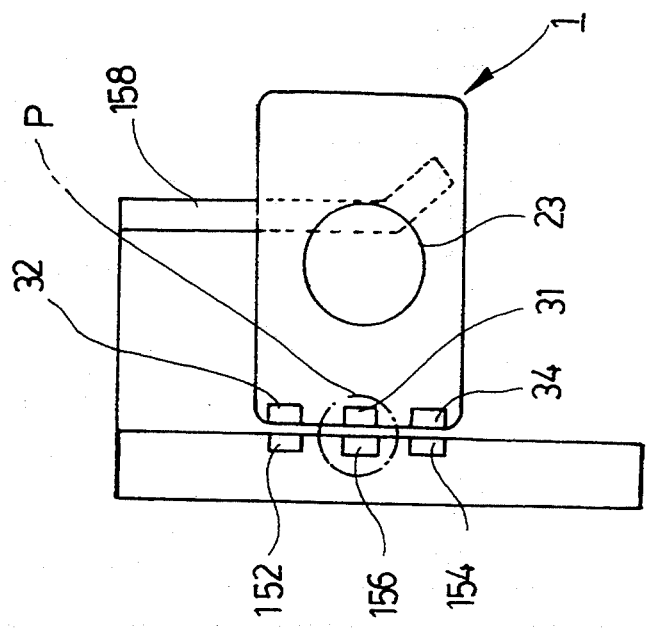
FIG. 11b is a view similar to FIG. 11a in which the robot cleaner is located at the precise charging position.
Figure 11A:
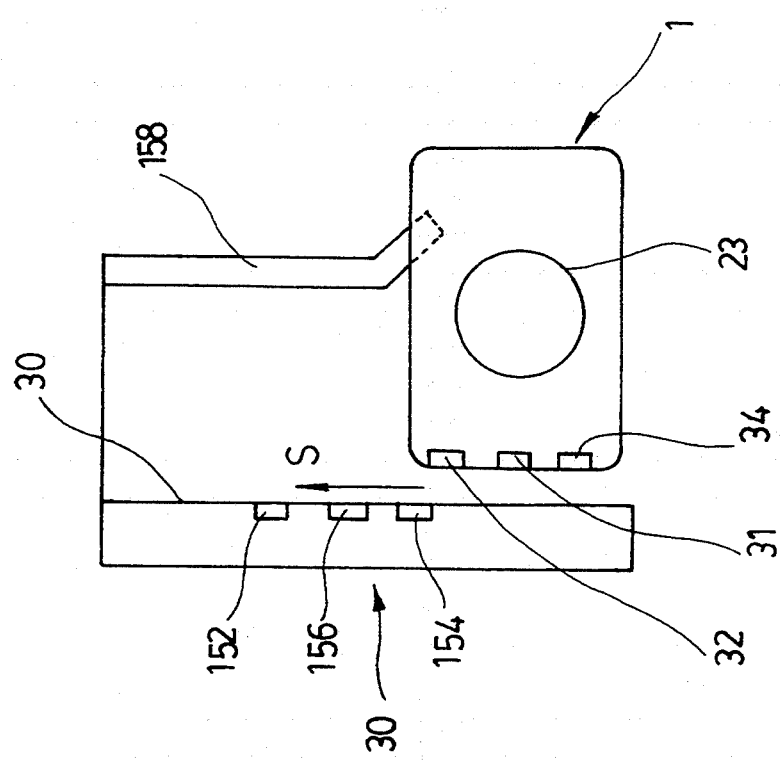
FIG. 11a is a plan view taken along the line I—I of FIG. 10 in which the robot cleaner is moved to vicinity of the charging means.

The automatic charging means for charging the battery of the robot cleaner according to the invention will now be described with reference to FIGS. 10 to 12. FIG. 10 shows the robot cleaner which has been moved to the automatic charging means, FIGS. 11a and 11b show a procedure that the robot cleaner approaches the automatic charging means and then a plug of the robot cleaner is connected to the charging receptacle, which are taken along the line I—I of FIG. 10, and FIG. 12 shows an enlarged section of the circle P of FIG. 11b.

As shown in the drawings, the automatic charging means 30, which has an alternating current applying plug 160, comprises an ultrasonic wave oscillator 150 which emits an ultrasonic wave so as to inform the robot cleaner 1 of its location during operation of the robot cleaner 1, a magnet sensing sensor 152 disposed under the ultrasonic wave oscillator 150 which is adapted to detect a line of magnetic force generated from the magnet 32 of the robot cleaner 1, a magnet 154 spaced from the magnet sensing sensor 152 which generates a line of magnetic force in order to cause the robot cleaner 1 to be precisely moved to the charging position, a direct current applying plug 156 which is adapted to be plugged in the charging receptacle 31 of the robot cleaner to charge the battery 26 when the robot cleaner 1 approaches the charging position, and a holding rail 158 formed at a bottom panel 29 which prevents the robot cleaner 1 from being moved when the direct current applying plug 156 is plugged in the charging receptacle 31 of the robot cleaner 1.

In the above automatic charging means, it is needless to say that the automatic charging means 30 has a rectifier circuit for converting the alternating current from the AC applying plug 160 into a direct current, and for charging the battery 26.

As shown in FIG. 12, the direct current applying plug 156 is fixed to an actuating rod 160a of a solenoid 160 at its base end 156a so as to be actuated by the solenoid 160. A coil spring 162 is inserted on the plug 156 and disposed between the base end 156a and a side wall 30a of the automatic charging means 30 so that the coil spring 162 causes the plug 156 to be separated from a conductor 31a of the charging receptacle 31 when the battery 26 is completely charged. The conductor 31a of the receptacle 31 is electrically connected to the battery 26 by means of a wiring (not shown).

A procedure for charging the battery 26 of the robot cleaner 1 will now be described.

The ultrasonic wave oscillator 150 of the automatic charging means 30 always emits an ultrasonic wave as long as the robot cleaner 1 is operated. When a charging voltage on the battery 26 is decreased below a predetermined level during operation of the robot cleaner 1, an operation of an ultrasonic wave generator of the ultrasonic sensor 116 of the navigation sensor 23 is stopped and only the ultrasonic wave receiver is operated under the control of the microprocessor 2. Therefore, the ultrasonic wave receiver of the ultrasonic wave sensor 116 receives the ultrasonic wave emitting from the ultrasonic wave oscillator 150 of the automatic charging means 30 and outputs its signal to the input port (IN3) of the microprocessor 2. Then, the microprocessor 2 determines the location of the automatic charging means 30 in response to the inputted signal and outputs a control signal to the driving means 5 through its output port (OUT1) in order to cause the robot cleaner 1 to be moved toward the automatic charging means 30.

As the robot cleaner 1 approaches the automatic charging means 30, as shown in FIG. 11a, the magnet sensing sensor 34 of the robot cleaner 1 receives the magnetic force generating from the magnet 154 of the automatic charging means 30 and outputs its signal to an input port (IN6) of the microprocessor 2. The microprocessor 2 outputs a driving control signal to the driving means 5 in response to the magnetic signal to cause the robot cleaner 1 to be moved in the direction of arrow "S" of FIG. 11a, so that the robot cleaner 1 is precisely located in order to permit the batery 26 of the robot cleaner 1 to be changed as shown in FIG. 11b. In FIGS. 11a and 11b, the magnet sensing sensor 152, the plug 156 and the magnet 154 of the charging means 30, and the corresponding magnet 32, the receptacle 31 and the sensor 34 of the robot cleaner 1 are shown as being arranged horizontally for a better understanding.

The precise condition of the robot cleaner 1 for charging the battery 26 can be obtained only when the magnet sensing sensor 152 of the automatic charging means 30 and the magnet sensing sensor 34 of the robot cleaner 1 face the magnet 32 of the robot cleaner 1 and the magnet 154 of the automatic charging means 30 respectively so that the magnet sensing sensors 152 and 34 receive the corresponding magnetic forces respectively.

When the robot cleaner 1 is precisely located with respect to the automatic charging means 30, as shown in FIG. 11b, the driving roller 6 of the robot cleaner 1 is obstructed by the holding railing 158 not to be moved rearward. Therefore, the robot cleaner 1 cannot be pushed rearward although the direct current applying plug 156 of the automatic charging means 30 is inserted into the charging receptacle 31 of the robot cleaner 1 against the coil spring 162 by the actuation of the solenoid 160. As a result of that, the direct current applying plug 156 of the charging means 30 is positively connected to conductor 31a of the charging receptacle 31, thereby permitting the battery 26 to be completely charged.

Since the power to the solenoid 160 is shut off after the battery 26 is completely charged, the direct current applying plug 156 is biased leftward of FIG. 12 by the restoring force of the coil spring 162. Accordingly, the plug 156 is electrically disconnected from the conductor 31a of the receptacle 31.

When the battery 26 is charged during a cleaning operation of the robot cleaner 1, it is needless to say that the microprocessor 2 outputs data regarding that portion of the floor which has been cleaned, that is, the data of a distance and a direction of cleaned floor which are inputted from the ultrasonic wave sensor 116 and the optical sensor 118 of the navigation sensor 23 by this time to the memory 3 through its input and output ports (I/O) so as to store the data in the memory 3.

Therefore, after the battery is completely charged, the robot cleaner 1 can return to the discontinued cleaning location of the floor and then again carry out its cleaning operation.

Figure 13:
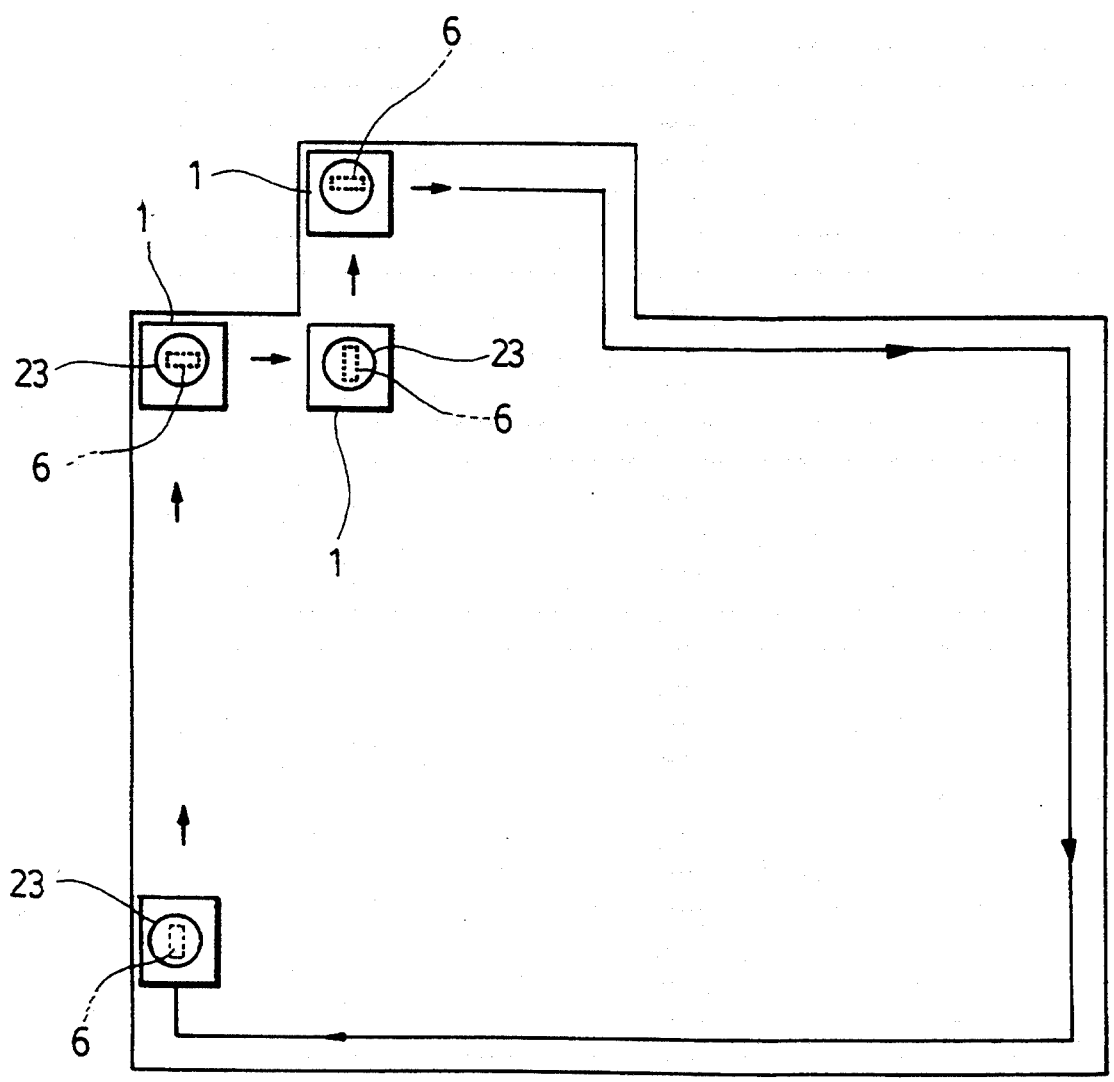
FIG. 13 shows an initial operation path of the robot cleaner according to the invention.

FIG. 13 shows an initial operation of the robot cleaner according to the invention. The robot cleaner 1 of the invention does not clean a floor but memorizes only the structure of the floor during its initial circulation. Then, the microprocessor 2 compares the structure with its cleaning programs previously stored in the memory 3 of the microprocessor 2 to select that program which is most similar to the structure and carries out the cleaning operation according to the selected program.

In other words, the microprocessor 2 discriminates the structure of the floor through the navigation sensor 23, the driving means 5 and the floor condition sensing means 28, and compares data of the discriminated structure with the data previously stored in the memory 3 in order to select the most efficient cleaning program.

Figure 14:
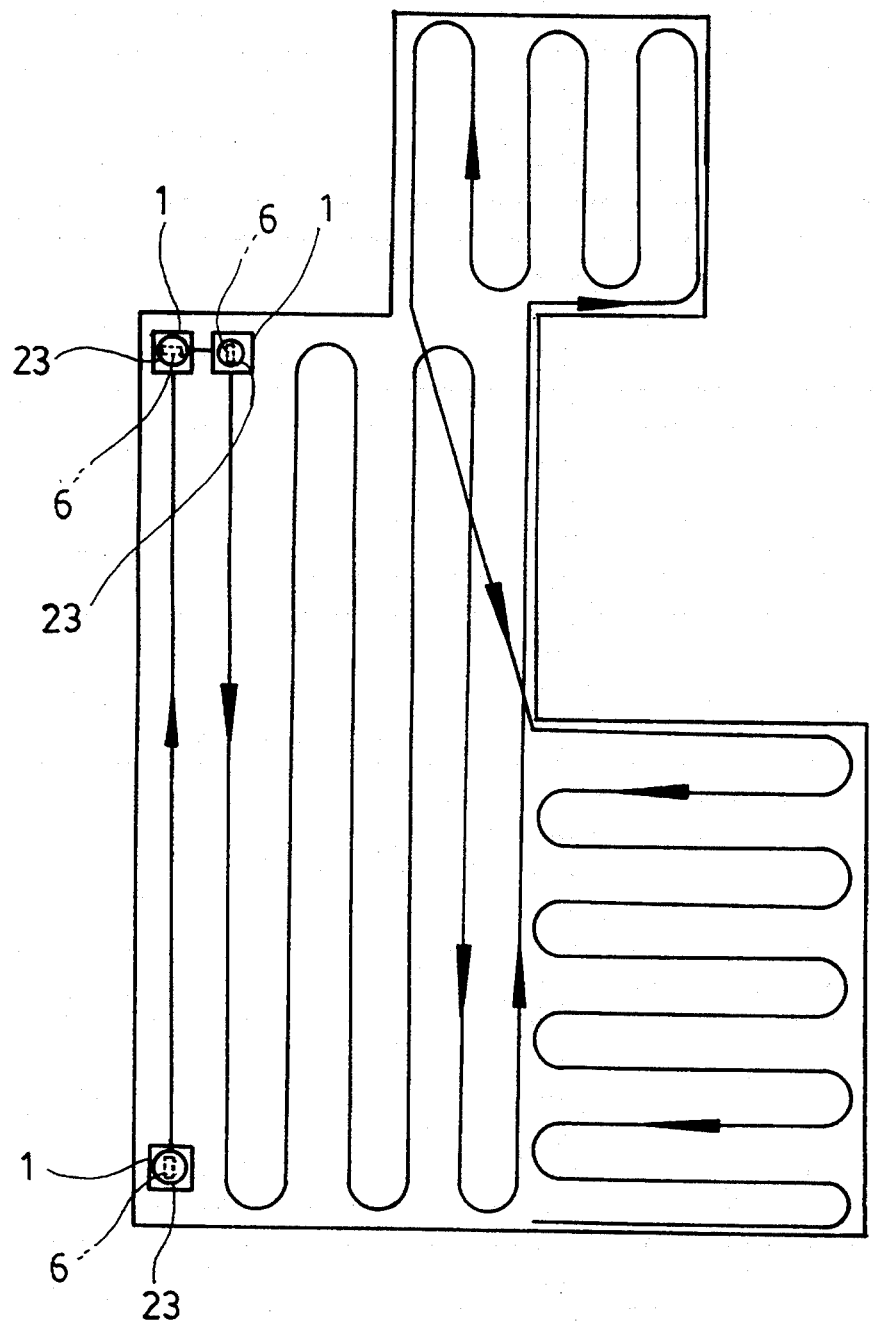
FIG. 14 shows a cleaning operation path for the robot cleaner of the invention.

FIG. 14 shows a path for a cleaning operation of the robot cleaner of the invention. The robot cleaner 1 moves along and parallel to walls of the room without cleaning operation during its initial circulation. During this circulation, the robot cleaner 1 memorizes a structure and a size of the room in the microprocessor 2 by detection of the navigation sensor 23, and compares the data of the structure of the room memorized in the microprocessor 2 with the data previously stored in the memory 3 to select the program most similar to the structure. Therefore, the robot cleaner 1 can carry out a cleaning operation according to the selected program.

A procedure for the initial operation of the robot cleaner of the invention will now be described with reference to FIG. 15.

Figure 15:
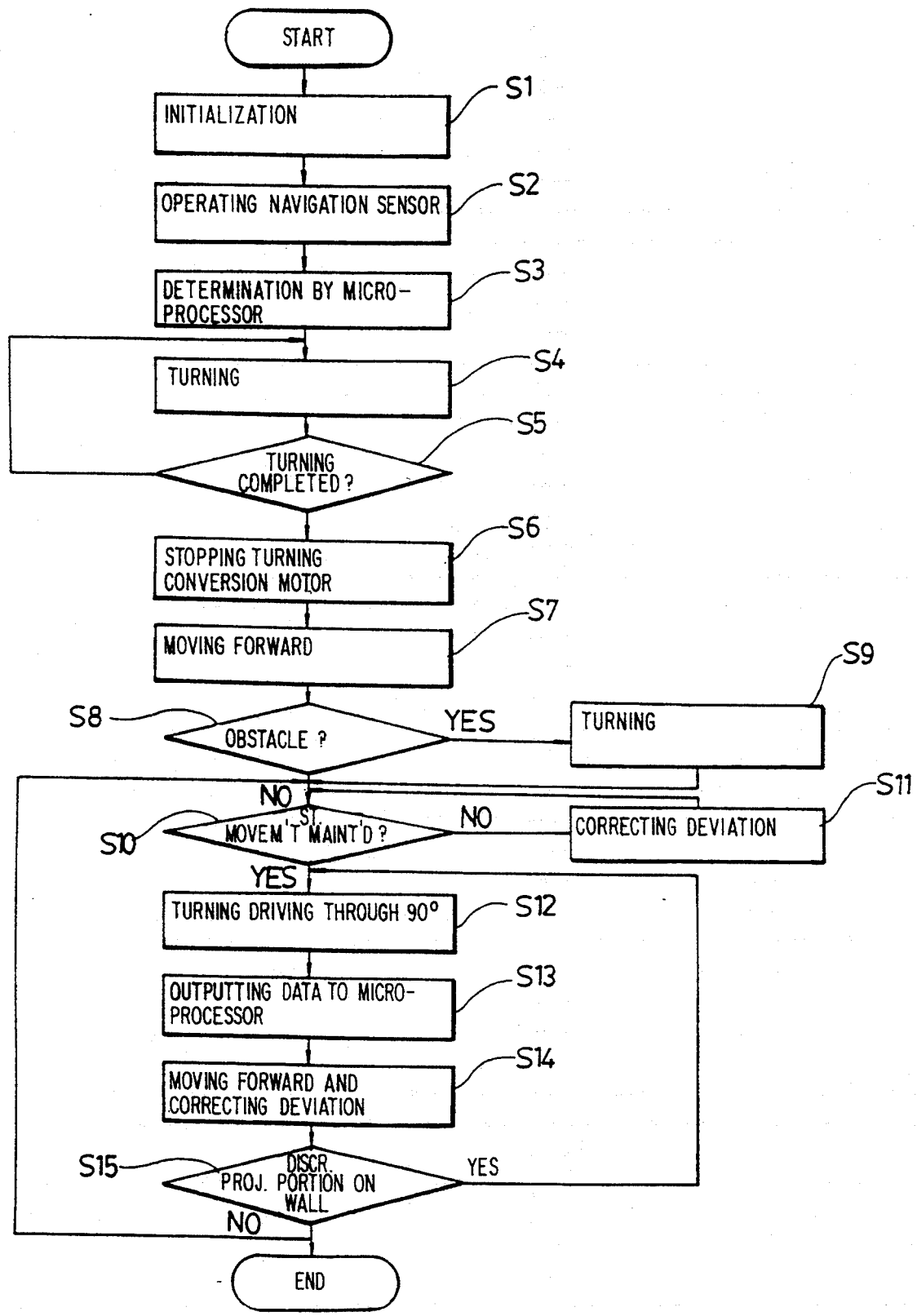
FIG. 15 is a flowchart exhibiting the procedure for the initial operation of the robot cleaner of the invention.

FIG. 15 shows a flowchart exhibiting the procedure for the initial operation of the robot cleaner of the invention. In the drawing, the letter "S" means a step.

First, when the user pushes the button on the control panel 22 of the robot cleaner 1 in order to operate the cleaner 1, the robot cleaner 1 is initialized at a step S1. Then, operation proceeds to a step S2, where the second driving motor 126 is driven and the navigation sensor 23 is operated to cause the ultrasonic wave sensor 116 to emit an ultrasonic wave and to receive the reflected wave. The reflected wave is outputted to the input port (IN3) of the microprocessor 2. Also, the optical sensor 118 emits light, receives the reflected light and outputs it to input port (IN3) of the microprocessor 2.

At a step S3, the microprocessor 2 determines a distance to an obstacle on the basis of the wave data received in the ultrasonic sensor 116 and determines a direction of the obstacle on the basis of the light data received in the optical sensor 118. In accordance with the determined distance and the determined direction, the microprocessor 2 outputs a control signal to the driving means 5 through its output port (OUT1) to cause the robot cleaner 1 to be moved to the cleaning start location closest to the present location.

At a step S4, the turning conversion motor 58 of the turning conversion means is driven to cause a moving direction of the driving roller 6 to be parallel to a wall so that the robot cleaner 1 can move along the wall.

Subsequently, whether or not the turning conversion of the robot cleaner 1 has been correctly accomplished is discriminated at a step S5. Otherwise stated, the optical sensor 82 of the turning direction sensing means 38 mounted on the bracket 59 of the driving means 5 emits light to the reflective mirrors 74 attached to the reflective disc 76, detects the reflected light from the reflective mirrors 74 through the condensing lens, and outputs the detected signal to the input port (IN5) of the microprocessor 2. On the basis of the detected light signal, the microprocessor 2 discriminates whether the driving means has been turned through a required angle.

When the microprocessor 2 discriminates that the turning conversion of the robot cleaner 1 has been correctly accomplished in the step S5, that is, if Yes, the operation proceeds to a step S6 where the turning conversion motor 58 of the driving means 5 is stopped.

At a step S7, the first driving motor 50 of the straight driving means is driven to cause the robot cleaner 1 to be moved forward along the wall.

At a step S8, whether or not an obstacle is present in front of the robot cleaner 1 is discriminated by the navigation sensor 23. When an obstacle is present in front of the cleaner, that is, if Yes, the operation proceeds to a step S10 after the turning conversion motor 58 of the driving means 5 is driven to cause the robot cleaner to be turned. On the other hand, when any obstacle is not present in front of the robot cleaner 1, that is, if No, the operation directly proceeds to the step S10 where the optical sensor 15 of the turning direction sensing means 38 emits light to the reflective mirrors 74, receives the reflected light data, and outputs it to the input port (IN5) of the microprocessor 2. On the basis of the received data, the microprocessor 2 discriminates whether the robot cleaner 1 maintains its normal straight movement.

At the step S10, when the normal straight movement of the robot cleaner 1 is not maintained, that is, if No, the operation proceeds to a step S11 where the output port (OUT1) of the microprocessor 2 outputs a control signal to the driving means 5 to correct the deviation of the robot cleaner 1. At the step S10, when the normal straight movement is maintained, that is, if Yes, the operation proceeds to a step S12.

When the robot cleaner 1 approaches a next wall during the normal straight movement, the turning conversion motor 58 of the driving means is driven, so that the robot cleaner 1 is turned right through 90° to be positioned parallel to the next wall at the step S12. Then, the microprocessor 2 inputs data of the moved distance and the turned angle at a step S13. Thereafter, the operation proceeds to a step S14 where the robot cleaner 1, which has been turned by using the turning direction sensing means 38 of the driving means 5 at the step S12, moves straight in the turned state.

During this straight movement, the optical sensor 118 of the navigation sensor 23 continuously emits light forward and senses the reflected light in order to discriminate whether the robot cleaner is normally moved without a deviation. At the same time, the robot cleaner 1 detects data of a distance to a next wall through the ultrasonic wave sensor 116 and outputs it to the input port (IN3) of the microprocessor 2. The microprocessor 2 determines the distance to the next wall on the basis of the inputted data and outputs a driving control signal of the distance to the driving means 5.

Subsequently, the operation proceeds to a step S15 where the robot cleaner 1 is turned through a right angle with respect to the wall and discriminates whether a projected portion is present on the wall. When a projected portion is not present, that is, if Yes, the operation returns to the step S12 and then the steps S12 to S15 are thus repeatedly performed. When a projected portion is not present on the wall at the step S15, the robot cleaner 1 is continuously driven to collect various data of the room to be cleaned.

That is, the microprocessor 2 inputs the data of the moved distance, the positions and turning directions at which the robot cleaner 1 has been turned while the robot cleaner 1 repeats the above-mentioned operation and then the robot cleaner 1 returns to the initial start location. At this time, the microprocessor 2 compares the inputted data with the various programs previously stored in the memory 3 and selects the program most similar to the structure of the room.

Figure 16:
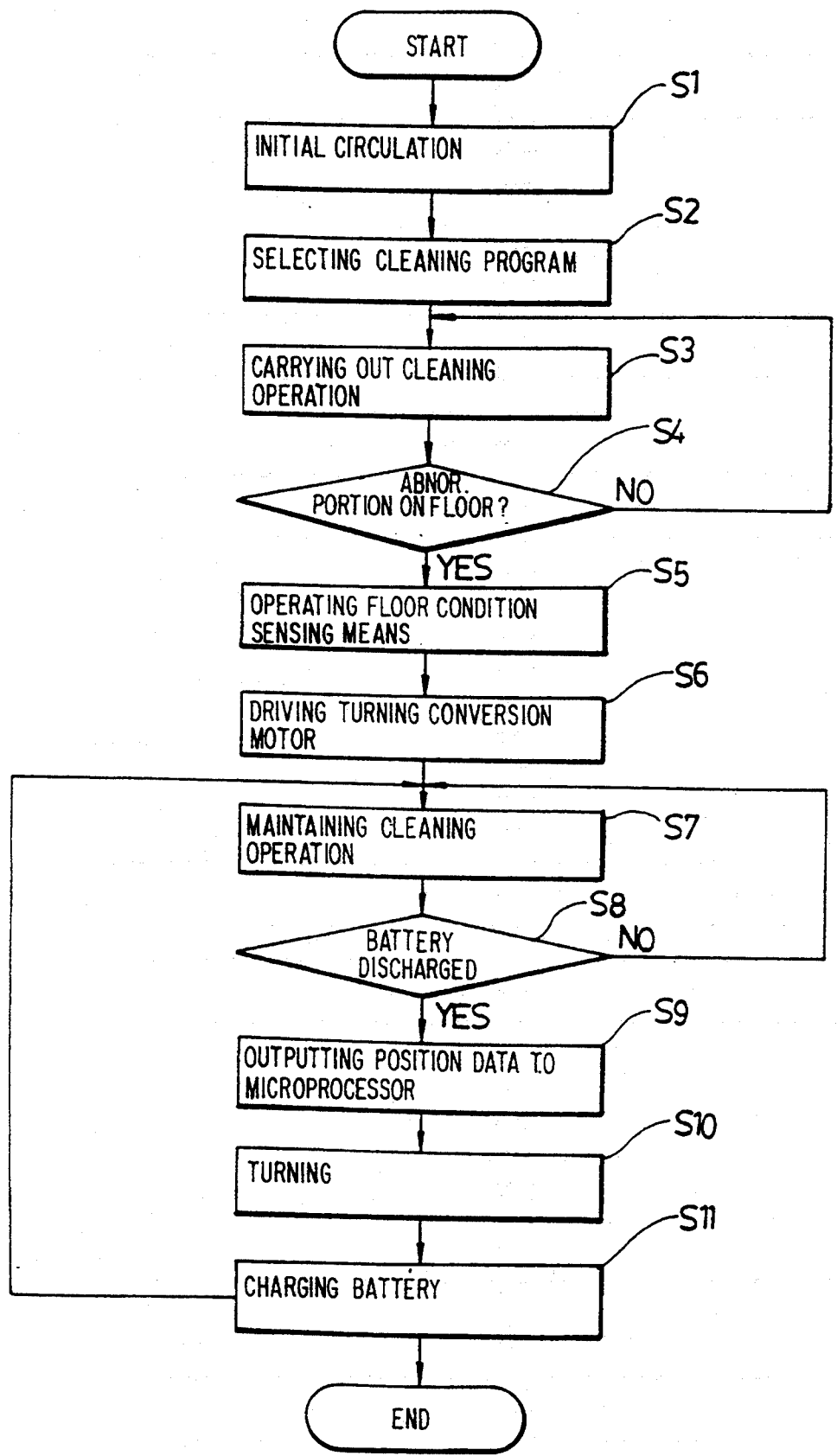
FIG. 16 is a flowchart exhibiting a procedure for a cleaning operation of the robot cleaner of the invention.

A procedure for a cleaning operation of the robot cleaner according to the invention will now be described with reference to FIG. 16. FIG. 16 shows a flowchart exhibiting a procedure for a cleaning operation of the robot cleaner.

First, the robot cleaner 1 performs the circulation operation in order to memorize the structure of the room at the step S1 in accordance with the flowchart of FIG. 15. Thereafter, at a step S2, the microprocessor 2 selects the most effective cleaning program from the cleaning programs previously stored in the memory 3 on the basis of the data of the structure of the room obtained during the initial circulation operation (i.e., during step S1).

Therefore, the robot cleaner 1 carries out a cleaning operation along the cleaning path shown in FIG. 14 in accordance with the cleaning program selected at the step S2. More specifically, the output port (OUT1) of the microprocessor 2 outputs a control signal to the first driving motor 50 of the driving means 5 so as to cause the first driving motor 50 to be driven. The rotating force of the first driving motor 50 is transmitted to the driving roller 6 through the first worm 52, the first and second worm wheels 54 and 56 and the driving shaft 6a, so that the robot cleaner 1 is moved parallel to the wall and along the cleaning path shown in FIG. 14. During this movement, the vacuum motor 8 is driven so that dust and dirt on the floor is sucked into the nozzle 10 of the suction duct 12 and collected in the dirt collecting chamber 16 through the air duct 14. In this case, since the filter 18 is interposed between the vacuum motor 8 and the direct collecting chamber 16, the dirt collected in the dirt collecting chamber 16 cannot be introduced into the vacuum motor 8 by means of the filter 18.

When the robot cleaner 1 approaches the opposite corner as shown in FIGS. 13 and 14, the ultrasonic wave sensor 116 and the optical sensor 118 of the navigation sensor 23 sense the front wall and output corresponding data to the microprocessor 2. Then, the microprocessor 2 discriminates the presence of the obstacle and thus outputs a control signal to the turning conversion motor 58 of the driving means 5 through the its output port (OUT1) to cause the turning conversion motor 58 to be driven, so that the turning conversion motor 58 rotates the driving roller 6, thereby causing the robot cleaner 1 to be turned clockwise. More specifically, upon driving the turning conversion motor 58, the second worm 60 is rotated clockwise. Accordingly, the third worm wheel 62 engaging with the second worm 60 and thus the first spur gear 64 fixed to the third worm wheel 62 are rotated counterclockwise, so that the turning conversion gear 66 engaging with the first spur gear 64 is rotated clockwise. Since the bracket 59 fixed in the turning conversion gear 66 is also rotated clockwise by the clockwise rotation of the turning conversion gear 66, the driving roller 6 supported by the bracket 59 is turned clockwise through an angle of 90°.

Thereafter, the microprocessor 2 outputs a control signal to the first driving motor 50 so that the robot cleaner 1 moves by a predetermined distance (that is, a width between adjacent cleaning paths). At this point, as the first driving motor 50 is rotated, the rotating force of the first driving motor 50 is transmitted to the driving roller 6 through the first worm 51, the first and second worm wheels 54 and 56 and the driving shaft 6a, so that the driving roller 6 is rotated to cause the robot cleaner 1 to be moved straight.

After the robot cleaner 1 has been moved by the predetermined distance, the microprocessor 2 again outputs again a turning control signal through its output port (OUT1) to cause the turning conversion motor 58 to be rotated clockwise. As the turning conversion motor 58 is rotated clockwise, the third worm 62 and the first spur gear 64 are rotated counterclockwise and thus the turning conversion gear 66 is rotated clockwise. Accordingly, since the bracket 59 is rotated clockwise through an angle of 90°, the robot cleaner 1 will be positioned in the direction opposite to the initial portion of the robot cleaner.

Then, the microprocessor 2 outputs a control signal to the first driving motor 50 to cause the robot cleaner 1 to be moved straight. During this straight movement, dust and dirt on the floor is sucked into the nozzle 10 and collected in the direct collecting chamber 16.

In the above operation, whether the robot cleaner 1 is precisely turned left or right can be discriminated by counting up the number of the reflective mirrors 74 attached to the reflection disc 76 which have been rotated during the turn. That is, the optical sensor 82 of the turning direction sensing means 38 emits light to the reflective mirrors 74 attached to the reflection disc 76 and receives the reflected light through the condensing lens 78 during the turn. At this time, when the robot cleaner 1 is turned clockwise, the amount of light received in the optical sensor 82 is small at the beginning and is gradually increased repeatedly because the reflective mirrors 74 are arranged such that the points of the mirrors 74 face counterclockwise. Therefore, the microprocessor 2 discriminates the turned angle by counting up the repeated fluctuation times of the amount of light (that is, the number of mirrors). On the other hand, when the robot cleaner 1 is turned counterclockwise, the amount of light received in the optical sensor 82 is larger at the beginning and is gradually decreased repeatedly. Therefore, the microprocessor 2 discriminates the turned angle by counting up the repeated fluctuation times of the amount of light (that is, the number of mirrors).

Thereafter, the operation proceeds to a step S4 where the microprocessor 2 discriminates whether a depressed portion or a stepped portion (i.e., an abnormal portion) is present on the floor during the cleaning operation. In the step S4, when a depressed portion or a stepped portion is not present on the floor in a moving direction of the robot cleaner 1, that is, if No, the robot cleaner 1 returns to the step S3 and then carries out the cleaning operation while repeatedly performing the steps S3 and S4. On the other hand, when an abnormal portion in present on the floor in the moving direction, that is, if Yes, the robot cleaner 1 proceeds to a step S5.

At the step S5, since the caster 24 of the floor condition sensing means 28 is operated as described with reference to FIGS. 8a and 8b, the microswitch 10b is turned on. Then, the microprocessor 2 outputs a control signal to the turning conversion motor 58 through its output port (OUT1) to cause the turning conversion motor 58 to be driven at a step S6. In the step S6, as the turning conversion motor 58 is driven, the second worm 60 connected to the motor 58 via the rotating shaft 58a is also rotated. The rotating force of the second worm 60 is transmitted to the turning conversion gear 66 through the third worm wheel 62 and the first spur gear 64. Hence, the bracket 59 fixed in the turning conversion gear 66 is rotated, so that the driving roller 6 is turned, thereby causing the moving direction of the robot cleaner 1 to be converted. Thereafter, the operation proceeds to a step S7 where the first driving motor 50 and the vacuum motor 8 are driven under the control of the microprocessor 2 to carry out a continuous cleaning operation.

During the above-described cleaning operation, the charge level detecting means 26a continuously detects the charge level of the battery 26 and outputs the detected data to the input port (IN1). At a step S8, when the microprocessor 2 discriminates that the charging voltage of the battery 26 has decreased to below a predetermined level, that is, if Yes, the operation proceeds to a step S9 where the ultrasonic wave sensor 116 and the optical sensor 118 of the navigation sensor 23 detect the existing position of the robot cleaner 1 and outputs the data of the position to the input port (IN3) of the microprocessor 2. At this time, the operation of the oscillating circuit of the ultrasonic wave sensor 116 is stopped under the control of the microprocessor 2 to cause the emission of ultrasonic wave from the ultrasonic wave sensor 116 to be interrupted while only the receiving circuit of the ultrasonic sensor 116 is operated to receive an ultrasonic wave generating from the ultrasonic wave oscillator 150 of the automatic charging means 30 and to output the received data to the input port (IN3) of the microprocessor 2. Accordingly, the microprocessor 2 determines the position of the charging means 30 on the basis of the data.

Then, at a step S10, the microprocessor 2 outputs a control signal corresponding to the determined position of the charging means 30 to the turning conversion motor 58 and the first driving motor 50 of the driving means 5, so that the robot cleaner 1 is turned from its moving direction and moved to the position of the charging means 30, as shown in FIGS. 10 to 11b. At this time, since the vacuum motor is not operated, dust and dirt is not sucked into the nozzle 10 of the suction duct 12.

After the robot cleaner 1 has been moved to the vicinity of the charging means 30, the operation proceeds to a step S11. At the step S11, the magnet sensing sensor 34 of the robot cleaner 1 detects the line of magnetic force generated from the magnet 154 of the automatic charging means 30 and then the microprocessor 2 outputs a control signal corresponding to the detected line to the turning conversion motor 58 of the driving means 5 through its output port (OUT1) to cause the robot cleaner 1 to be moved in the direction of arrow of FIG. 11a. When the robot cleaner 1 is precisely located at the charging position, the operation proceeds to a step S11. At this time, since the magnet sensing sensor 34 of the robot cleaner 1 directly detects the magnetic force generated from the magnet 154 of the charging means 30 while the magnet sensing sensor 152 of the charging means 30 directly detects the magnetic force generated from the magnet 32 of the robot cleaner 1, the solenoid 160 of the charging means 30 is applied with power. Therefore, the actuating rod 160a of the solenoid 160 and thus the plug 156 are moved outward against the coil spring 162. As the plug 156 is projected outward, the plug 156 comes into contact with the conductor 31a of the receptacle 31 of the robot cleaner 1, thereby permitting the battery 26 to be charged with direct current.

When the battery 26 is completely charged in the step S11, the robot cleaner 1 returns to the step S7 and performs repeatedly the steps S7 to S11. That is, the robot cleaner 1 moves to the position at which the cleaning operation is interrupted (particularly, the position at which the charging voltage of the battery 26 is decreased to below the predetermined level) and then again carries out the cleaning operation at the position.

As apparent from the above description, the robot cleaner of the present invention can carry out a cleaning operation by itself while moving on a floor. Also, when the charging voltage of the battery of the robot cleaner is decreased to below a predetermined level during the cleaning operation, the robot cleaner moves to the automatic charging means and then charges the battery by itself. Thereafter, the robot cleaner returns to the interrupted position, at which the charging voltage of the battery is decreased, and again carries out the cleaning operation. Accordingly, since the robot cleaner of the invention does not need to be constantly monitored by the user, any one can easily use the robot cleaner in a cleaning operation.

In the above embodiment, although the robot cleaner has been described in such a way that the rotating shaft 50a of the first driving motor 50 is connected to the first worm 52 and the first worm 52 is engaged with the first worm wheel 54 to cause the rotating force of the driving motor 50 to be transmitted to the driving roller 6, the invention is not be limited to this embodiment, for example, it is possible to use spur gears having different numbers of gear teeth instead of the first worm 52 and the first worm wheel 54.

In addition, although the robot cleaner has been described in such a way that the rotating shaft 58a of the turning conversion motor 58 is connected to the second worm 60 and the second worm 60 is engaged with the third worm wheel 62 to cause the rotating force of the turning conversion motor 58 to be transmitted to the turning conversion gear 66, the invention is not limited to this embodiment, for example, it is possible to use spur gears having different numbers of gear teeth instead of the second worm 60 and the third worm wheel 62.

Having described specific preferred embodiments of the invention with reference to the accompanying drawings, it is to be understood that the invention is not limited to this precise embodiments, and that various changes and modifications may be effected therein by one skilled in the art without departing from the scope or spirit of the invention as defined in the appended claims.

What is claimed is:

1. A robot cleaner comprising:
   a cleaner body;
   suction means provided in the cleaner body for sucking dirt on a floor;
   a navigation sensor provided at a top of the cleaner body for sensing a distance and a direction of an obstacle and for outputting a distance sensing signal and a direction sensing signal;
   driving means provided at a bottom of the cleaner body for moving the cleaner body in a moving direction;
   control means for determining a cleaning area and a moving direction of the cleaner body in response to the distance sensing signal and the direction sensing signal from the navigation sensor and for outputting a control signal for moving the cleaner body in the moving direction and a control signal for driving the suction means; and
   sensing means provided at a lower portion of the cleaner body and adapted to sense dirt and output a dirt sensing signal to which said control means responses responds for generating a control signal to drive the suction means.

2. A robot cleaner in accordance with claim 1, wherein said driving means comprises straight driving means for moving the robot cleaner forward and backward and turning conversion means for converting a turning direction of the cleaner into a left turn or a right turn.

3. A robot cleaner in accordance with claim 1, wherein said suction means is a vacuum motor.

4. A robot cleaner in accordance with claim 1, wherein said control means is a microprocessor.

5. A robot cleaner comprising:
   a cleaner body;
   suction means provided in the cleaner body for sucking dirt on a floor;
   a navigation sensor provided at a top of the cleaner body for sensing a distance and a direction of an obstacle and for outputting a distance sensing signal and a direction sensing signal;
   driving means provided at a bottom of the cleaner body for moving the cleaner body in a moving direction; and
   control means for determining a cleaning area and a moving direction of the cleaner body in response to the distance sensing signal and the direction sensing signal from the navigation sensor and for outputting a control signal for moving the cleaner body in the moving direction and a control signal for driving the suction means, wherein said driving means comprises straight driving means for moving the robot cleaner forward and backward and turning conversion means for converting a turning direction of the cleaner into a turning left or a turning right, and wherein said straight driving means comprises a first driving motor rotating normally and reversely, a first worm connected to a rotating shaft of the first driving motor, a first worm wheel engaged with the first worm, a second worm wheel engaged with the first worm wheel for adjusting a rotating speed, and a driving roller connected to a driving shaft of the second worm wheel and adapted to rotate normally and reversely.

6. A robot cleaner comprising:
   a cleaner body;
   suction means provided in the cleaner body for sucking dirt on a floor;
   a navigation sensor provided at a top of the cleaner body for sensing a distance and a direction of an obstacle and for outputting a distance sensing signal and a direction sensing signal;
   driving means provided at a bottom of the cleaner body for moving the cleaner body in a moving direction; and
   control means for determining a cleaning area and a moving direction of the cleaner body in response to the distance sensing signal and the direction sensing signal from the navigation sensor and for outputting a control signal for moving the cleaner body in the moving direction and a control signal for driving the suction means, wherein said driving means comprises straight driving means for moving the robot cleaner forward and backward and turning conversion means for converting a turning direction of the cleaner into a turning left or a turning right, and wherein said turning conversion means comprises a turning conversion motor for rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

7. A robot cleaner comprising:

a cleaner body;

suction means provided in the cleaner body for sucking dirt on a floor;

a navigation sensor provided at a top of the cleaner body for sensing a distance and a direction of an obstacle and for outputting a distance sensing signal and a direction sensing signal;

driving means provided at a bottom of the cleaner body for moving the cleaner body in a moving direction; and control means for determining a cleaning area and a moving direction of the cleaner body in response to the distance sensing signal and the direction sensing signal from the navigation sensor and for outputting a control signal for moving the cleaner body in the moving direction and a control signal for driving the suction means, wherein said driving means comprises a first driving motor rotating normally and reversely a first worm connected to a rotating shaft of the first driving motor, a first worm wheel engaged with the first worm, a second worm wheel engaged with the first worm wheel for adjusting a rotating speed, a driving roller connected to a driving shaft of the second worm wheel and adapted to rotate normally and reversely, a turning conversion motor rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

8. A robot cleaner in accordance with claim 7, wherein the number of gear teeth formed at the first worm wheel is larger than that of gear teeth formed at the second worm wheel.

9. A robot cleaner in accordance with claim 7, wherein the number of gear teeth formed at the third worm wheel is larger than that of gear teeth formed at the first spur gear.

10. A robot cleaner comprising:

a cleaner body;

suction means provided in the cleaner body for sucking dirt on a floor;

a navigation sensor provided at a top of the cleaner body for sensing a distance and a direction of an obstacle and for outputting a distance sensing signal and a direction sensing signal;

driving means provided at a bottom of the cleaner body for moving the cleaner body in a moving direction; and control means for determining a cleaning area and a moving direction of the cleaner body in response to the distance sensing signal and the direction sensing signal from the navigation sensor and for outputting a control signal for moving the cleaner body in the moving direction and a control signal for driving the suction means, wherein said navigation sensor comprises an ultrasonic wave sensor adapted to emit an ultrasonic wave in a moving direction, receive the reflected wave, and output it to microprocessor for determining a distance to be moved, an optical sensor adapted to emit light, receive the reflected light, and output it to the microprocessor for determining a direction to be moved, a cylindrical protector for accommodating and protecting the ultrasonic wave sensor and the optical sensor, a bracket supporting the ultrasonic wave sensor and the optical sensor, a deflective reflection collar provided at a lower end of the protector and adapted to reflect the light emitting from the optical sensor at a predetermined deflective angle for determining a direction to be moved, and sensor driving means for rotating the ultrasonic wave sensor and the optical sensor fixed to the bracket.

11. A robot cleaner in accordance with claim 10, wherein said sensor driving means comprises a second driving motor, a third spur gear connected to a rotating shaft of the second driving motor, a fourth spur gear engaged with the third spur gear, and a driving shaft attached with the bracket and fixed to the center of the fourth spur gear to be rotated by rotation of the fourth spur gear.

12. A robot cleaner comprising:

a cleaner body;

driving means provided at a bottom of the cleaner body for moving the cleaner body in a predetermined moving direction;

sensing means provided at a top of the cleaner for sensing a distance to and a direction of an obstacle and outputting a distance sensing signal and a direction sensing signal, and control means for controlling to cause the cleaner body to be moved along an inner contour of an area to be cleaned in response to the distance sensing signal and the direction sensing signal from the sensing means, thereby determining the area to be cleaned, wherein said driving means comprises straight driving means for moving the robot cleaner forward and backward and turning conversion means for converting a turning direction of the cleaner into a left turn or a right turn, and wherein said straight driving means comprises a first driving motor rotating normally and reversely, a first worm connected to a rotating shaft of the first driving motor, a first worm wheel engaged with the first worm, a second worm wheel engaged with the first worm wheel for adjusting a rotating speed, and a driving roller connected to a driving shaft of the second worm wheel and adapted to rotate normally and reversely.

13. A robot cleaner comprising:

a cleaner body;

driving means provided at a bottom of the cleaner body for moving the cleaner body in a predetermined moving direction;

sensing means provided at a top of the cleaner for sensing a distance to and a direction of an obstacle and outputting a distance sensing signal and a direction sensing signal, and control means for controlling to cause the cleaner body to be moved along an inner contour of an area to be cleaned in response to the distance sensing signal and the direction sensing signal from the sensing means, thereby determining the area to be cleaned, wherein said driving means comprises straight driving means for moving the robot cleaner forward and backward and turning conversion means for converting a turning direction of the cleaner into a left turn or a right turn, and wherein said turning conversion means comprises a turning conversion motor rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

14. A robot cleaner comprising:
a cleaner body;
driving means provided at a bottom of the cleaner body for moving the cleaner body in a predetermined moving direction;
sensing means provided at a top of the cleaner for sensing a distance to and a direction of an obstacle and outputting a distance sensing signal and a direction sensing signal, and
control means for controlling to cause the cleaner body to be moved along an inner contour of an area to be cleaned in response to the distance sensing signal and the direction sensing signal from the sensing means, thereby determining the area to be cleaned, wherein said driving means comprises a first driving motor for rotating normally and reversely, a first worm connected to a rotating shaft of the first driving motor, a first worm wheel engaged with the first worm, a second worm wheel engaged with the first worm wheel for adjusting a rotating speed, a driving roller connected to a driving shaft of the second worm wheel and adapted to rotate normally and reversely, a turning conversion motor for rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

15. A robot cleaner in accordance with claim 14, wherein the number of gear teeth formed at the first worm wheel is larger than that of gear teeth formed at the second worm wheel.

16. A robot cleaner in accordance with claim 14, wherein the number of gear teeth formed at the third worm wheel is larger than that of gear teeth formed at the first gear.

17. A robot cleaner in accordance with claim 14, wherein said sensing means is a navigation sensor.

18. A robot cleaner comprising:
a cleaner body;
driving means provided at a bottom of the cleaner body for moving the cleaner body in a predetermined moving direction;
sensing means provided at a top of the cleaner for sensing a distance to and a direction of an obstacle and outputting a distance sensing signal and a direction sensing signal, and
control means for controlling to cause the cleaner body to be moved along an inner contour of an area to be cleaned in response to the distance sensing signal and the direction sensing signal from the sensing means, thereby determining the area to be cleaned, wherein said sensing means is a navigation sensor, and wherein said navigation sensor comprises an ultrasonic wave sensor adapted to emit an ultrasonic wave in a moving direction, receive the reflected wave, and output it to a microprocessor for determining a distance to be moved, an optical sensor adapted to emit light, receive the reflected light, and output it to the microprocessor for determining a direction to be moved, a cylindrical protector accommodating and protecting the ultrasonic wave sensor and the optical sensor, a bracket supporting the ultrasonic wave sensor and the optical sensor, a deflective reflection collar provided at a lower end of the protector and adapted to reflect the light emitting from the optical sensor at a predetermined deflective angle for determining a direction to be moved, and sensor driving means for rotating the ultrasonic wave sensor and the optical sensor fixed to the bracket.

19. A robot cleaner in accordance with claim 18, wherein said sensor driving means comprises a second driving motor, a third spur gear connected to a rotating shaft of the second driving motor, a fourth spur gear engaged with the third spur gear, and a driving shaft attached with the bracket and fixed to the center of the fourth spur gear to be rotated by rotation of the fourth spur gear.

20. A robot cleaner in accordance with claim 18, wherein said deflective reflection collar is provided at its inner surface with between 36 and 720 triangular mirrors.

21. A sensing device comprising:
optical sensing means for emitting light and receiving the reflected light;
ultrasonic wave sensing means for emitting an ultrasonic wave and receiving the reflected ultrasonic wave;
mounting means for mounting thereon the optical sensing means and the ultrasonic wave sensing means spaced from each other;
rotating means for rotating the optical sensing means and the ultrasonic wave sensing means mounted on the mounting means; and a light reflection disc spaced from the optical sensing means and vertically positioned with respect to the light emitting from the optical sensing means, which is provided thereon with a plurality of continual reflective means in order to determine a turned angle of the optical sensing means when the optical sensing means is turned, whereby the ultrasonic wave sensing means senses a distance to an obstacle and the optical sensing means senses a direction of the obstacle.

22. A sensing device in accordance with claim 21, wherein said mounting means is a bracket.

23. A sensing device in accordance with claim 21, wherein said rotating means comprises a second driving motor, a third spur gear connected to a rotating shaft of the second driving motor, a fourth spur gear engaged with the third spur gear, and a driving shaft attached with the bracket and fixed to the center of the fourth spur gear to be rotated by rotation of the fourth spur gear.

24. A robot cleaner comprising:
a cleaner body;
driving means provided at a bottom of the cleaner body for moving the cleaner body on a floor;
wheel means mounted on at least four corners of the bottom of the cleaner body for movably supporting the cleaner body;
switch means associated with the wheel means; and
control means for controlling the driving means to cause the cleaner body to be stopped and turned by switching action of the corresponding switch means when any of the wheel means encounters a depressed portion or a stepped portion on a floor.

25. A robot cleaner in accordance with claim 24, wherein said wheel means are casters.

26. A robot cleaner comprising:
a cleaner body;
driving means provided at a bottom of the cleaner body for moving the cleaner body on a floor;
wheel means mounted on at least four corners of the bottom of the cleaner body for supporting movably the cleaner body;
switch means associated with the wheel means; and
control means for controlling the driving means to cause the cleaner body to be stopped and turned by switching action of the corresponding switch means when any of the wheel means encounters a depressed portion or a stepped portion on a floor, wherein said driving means comprises straight driving means for moving the robot cleaner forward and backward and turning conversion means for converting a turning direction of the cleaner into a left turn or a right turn.

27. A robot cleaner comprising:
a cleaner body;
driving means provided at a bottom of the cleaner body for moving the cleaner body on a floor;
wheel means mounted on at least four corners of the bottom of the cleaner body for supporting movably the cleaner body;
switch means associated with the wheel means; and
control means for controlling the driving means to cause the cleaner body to be stopped and turned by switching action of the corresponding switch means when any of the wheel means encounters a depressed portion or a stepped portion on a floor, wherein said straight driving means comprises a first driving motor for rotating normally and reversely, a first worm connected to a rotating shaft of the first driving motor, a first worm wheel engaged with the first worm, a second worm wheel engaged with the first worm wheel for adjusting a rotating speed, and a driving roller connected to a driving shaft of the second worm wheel and adapted to rotate normally and reversely.

28. A robot cleaner comprising:
a cleaner body;
driving means provided at a bottom of the cleaner body for moving the cleaner body on a floor;
wheel means mounted on at least four corners of the bottom of the cleaner body for supporting movably the cleaner body;
switch means associated with the wheel means; and
control means for controlling the driving means to cause the cleaner body to be stopped and turned by switching action of the corresponding switch means when any of the wheel means encounters a depressed portion or a stepped portion on a floor, wherein said turning conversion means comprises a turning conversion motor for rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

29. A robot cleaner comprising:
a cleaner body;
driving means provided at a bottom of the cleaner body for moving the cleaner body on a floor;
wheel means mounted on at least four corners of the bottom of the cleaner body for supporting movably the cleaner body;
switch means associated with the wheel means; and
control means for controlling the driving means to cause the cleaner body to be stopped and turned by switching action of the corresponding switch means when any of the wheel means encounters a depressed portion or a stepped portion on a floor, wherein said driving means comprises a first driving motor for rotating normally and reversely, a first worm connected to a rotating shaft of the first driving motor, a first worm wheel engaged with the first worm, a second worm wheel engaged with the first worm wheel for adjusting a rotating speed, a driving roller connected to a driving shaft of the second worm wheel and adapted to rotate normally and reversely, a turning conversion motor for rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

30. A robot cleaner in accordance with claim 29, wherein the number of gear teeth formed at the first worm wheel is larger than that of gear teeth formed at the second worm wheel.

31. A robot cleaner in accordance with claim 29, wherein the number of gear teeth formed at the third worm wheel is larger than that of gear teeth formed at the first spur gear.

32. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights.

33. A robot cleaner in accordance with claim 32, wherein said driving means comprises straight driving means for moving the robot cleaner forward and backward and turning conversion means for converting a turning direction of the cleaner into a left turn or a right turn.

34. A robot cleaner in accordance with claim 32, wherein said direction sensing means comprises a hermetic housing, a magnetic needle received in the hermetic housing and rotatably supported by upper and lower supporters of the hermetic housing at its central shaft for indicating the north and south poles, a reflection disc rotatably fixed to the central shaft of the magnetic needle and provided with a plurality of reflective mirrors thereon, a condensing lens attached to an upper portion of the hermetic housing for condensing light, and an optical sensor adapted to emit light to the reflective mirrors on the reflection disc and to receive the reflected light for detecting a turned angle of the driving means and outputting it to a microprocessor.

35. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights, wherein said driving means comprises straight driving means for moving the robot cleaner forward and backward and turning conversion means for converting a turning direction of the cleaner into a left turn or a right turn, and wherein said straight driving means comprises a first driving motor for rotating normally and reversely, a first worm connected to a rotating shaft of the first driving motor, a first worm wheel engaged with the first worm, a second worm wheel engaged with the first worm wheel for adjusting a rotating speed, and a driving roller connected to a driving shaft of the second worm wheel and adapted to rotate normally and reversely.

36. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights, wherein said driving means comprises straight driving means for moving the robot cleaner forward and backward and turning conversion means for converting a turning direction of the cleaner into a left turn or a right turn, and wherein said turning conversion means comprises a turning conversion motor for rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

37. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights, wherein said driving means comprises a first driving motor rotating normally and reversely, a first worm connected to a rotating shaft of the first driving motor, a first worm wheel engaged with the first worm, a second worm wheel engaged with the first worm wheel for adjusting a rotating speed, a driving roller connected to a driving shaft of the second worm wheel and adapted to rotate normally and reversely, a turning conversion motor rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed a flange of the bracket and a bottom plate of the cleaner body for permitting the bracket to be smoothly rotated.

38. A robot cleaner in accordance with claim 37, wherein the number of gear teeth formed at the first worm wheel is larger than that of gear teeth formed at the second worm wheel.

39. A robot cleaner in accordance with claim 37, wherein the number of gear teeth formed at the third worm wheel is larger than that of gear teeth formed at the first spur gear.

40. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights, wherein said direction sensing means comprises a hermetic housing, a magnetic needle received in the hermetic housing and rotatably supported by upper and lower supporters of the hermetic housing at its central shaft for indicating the north and south poles, a reflection disc rotatably fixed to the central shaft of the magnetic needle and provided with a plurality of reflective mirrors thereon, a condensing lens attached to an upper portion of the hermetic housing for condensing light, and an optical sensor adapted to emit light to the reflective mirrors on the reflection disc and to receive the reflected light for detecting a turned angle of the driving means and outputting it to a microprocessor, and wherein said hermetic housing contains transparent oil or liquid therein.

41. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights, wherein said direction sensing means comprises a hermetic housing, a magnetic needle received in the hermetic housing and rotatably supported by upper and lower supporters of the hermetic housing at its central shaft for indicating the north and south poles, a reflection disc rotatably fixed to the central shaft of the magnetic needle and provided with a plurality of reflective mirrors thereon, a condensing lens attached to an upper portion of the hermetic housing for condensing light, and an optical sensor adapted to emit light to the reflective mirrors on the reflection disc and to receive the reflected light for detecting a turned angle of the driving means and outputting it to a microprocessor, and wherein each of said reflective mirrors has a triangular shape.

42. A robot cleaner comprising:
a cleaner body;
driving means provided at a bottom of the cleaner body and in contact with a floor for moving the cleaner body in a predetermined direction; and
direction sensing means integrally mounted on the driving means for sensing a moving direction of the driving means, said direction sensing means having a housing, a central shaft rotatably and vertically supported in the housing, a disc vertically and rotatably fixed to the central shaft at its center and provided with a permanent magnet, a plurality of reflective means defining a circle provided on a surface of the disc, and means mounted on the housing for sensing a turned angle of the driving means by emitting light to the reflective means and receiving and counting up the reflected lights, wherein said direction sensing means comprises a hermetic housing, a magnetic needle received in the hermetic housing and rotatably supported by upper and lower supporters of the hermetic housing at its central shaft for indicating the north and south poles, a reflection disc rotatably fixed to the central shaft of the magnetic needle and provided with a plurality of reflective mirrors thereon, a condensing lens attached to an upper portion of the hermetic housing for condensing light, and an optical sensor adapted to emit light to the reflective mirrors on the reflection disc and to receive the reflected light for detecting a turned angle of the driving means and outputting it to a microprocessor, and wherein said reflection disc is provided with between 36 and 360 triangular reflective mirrors thereon for detecting a clockwise or a counterclockwise turn of the driving means.

43. A robot cleaner system comprising:
a cleaner body;
driving means for moving the cleaner body;
a sensor rotatably mounted on an upper portion of the cleaner body;
a storage battery provided in the cleaner body;
a charging terminal provided at an outer surface of the cleaner body for applying current to the storage battery;
a charging station positioned separately from the cleaner body and provided with signal generating means for informing the cleaner body of the location of the charging station and with a charging source adapted to be connected to the charging terminal of the cleaner body when the storage battery is charged; and control means provided in the cleaner body for detecting a charged condition of the storage battery and controlling the driving means to cause the cleaner body to be moved to the charging station while the sensor senses a signal from the signal generating means, thereby permitting the storage battery to be charged with energy of the charging source by connection of the charging terminal and the charging source, wherein said driving means comprises straight driving means for moving the robot cleaner forward and backward and turning conversion means for converting a turning direction for the cleaner into a left turn or a right turn.

44. A robot cleaner system in accordance with claim 43, wherein said straight driving means comprises a first driving motor for rotating normally and reversely, a first worm connected to a rotating shaft of the first driving motor, a first worm connected to a rotating shaft of the first driving motor, a first worm wheel engaged with the first worm, a second worm wheel engaged with the first worm wheel for adjusting a rotating speed, and a driving roller connected to a driving shaft of the second worm wheel and adapted to rotate normally and reversely.

45. A robot cleaner system in accordance with claim 43, wherein said turning conversion means comprises a turning conversion motor for rotating normally and reversely, a second worm connected to a rotating shaft of the turning conversion motor, a third worm wheel engaged with the second worm, a second spur gear concentrically fixed to an underside of the third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

46. A robot cleaner, system comprising:
a cleaner body;
driving means for moving the cleaner body;
a sensor rotatably mounted on an upper portion of the cleaner body;
a storage battery provided in the cleaner body;
a charging terminal provided at an outer surface of the cleaner body for applying current to the storage battery;
a charging station positioned separately from the cleaner body and provided with signal generating means for informing the cleaner body of the location of the charging station and with a charging source adapted to be connected to the charging terminal of the cleaner body when the storage battery is charged; and control means provided in the cleaner body for detecting a charged condition of the storage battery and controlling the driving means to cause the cleaner body to be moved to the charging station while the sensor senses a signal from the signal generating means, thereby permitting the storage battery to be charged with energy of the charging source by connection of the charging terminal and the charging source, wherein said driving means comprises a first driving motor for rotating normally and reversely, a first worm connected to a rotating shaft of the first driving motor, a first worm wheel engaged with the first worm, a second worm wheel engaged with the first worm wheel for adjusting a rotating speed, a driving roller connected to a driving shaft of the second worm wheel and adapted to rotate normally and reversely, a turning conversion motor for rotating normally and reversely, a second worm connected to a rotating shaft of the turning conversion motor, a third worm wheel for increasing a rotating speed, a turning conversion gear fixed to a periphery of a bracket supporting the driving roller and engaged with the first spur gear for turning the bracket left and right, and a ball bearing interposed between a flange of the bracket and a bottom plate of the cleaner body for permitting the bracket to be smoothly rotated.

47. A robot cleaner system in accordance with claim 46, wherein said charging terminal is a plug for applying direct current.

48. A robot cleaner system in accordance with claim 46, wherein said charging station is an automated charging means.

* * * * *